US011812873B2

(12) United States Patent
Park

(10) Patent No.: US 11,812,873 B2
(45) Date of Patent: Nov. 14, 2023

(54) CHAIR INCLUDING MULTI-CHANNEL SOUND SYSTEM

(71) Applicant: TROUND INC., Hanam-si (KR)

(72) Inventor: Jea Bum Park, Namyangju-si (KR)

(73) Assignee: TROUND INC., Hanam-si (KR)

( * ) Notice: Subject to any disclaimer, the term of this patent is extended or adjusted under 35 U.S.C. 154(b) by 0 days.

(21) Appl. No.: 18/153,196

(22) Filed: Jan. 11, 2023

(65) Prior Publication Data

US 2023/0165378 A1 Jun. 1, 2023

Related U.S. Application Data

(63) Continuation of application No. PCT/KR2021/010465, filed on Aug. 9, 2021.

(30) Foreign Application Priority Data

Aug. 12, 2020 (KR) .................. 10-2020-0101112

(51) Int. Cl.
| | |
|---|---|
| *A47C 7/72* | (2006.01) |
| *H04R 5/02* | (2006.01) |
| *H04R 1/32* | (2006.01) |
| *H04S 3/00* | (2006.01) |
| *H04R 1/02* | (2006.01) |
| *B60N 2/879* | (2018.01) |

(52) U.S. Cl.
CPC .............. *A47C 7/727* (2018.08); *H04R 1/025* (2013.01); *H04R 1/026* (2013.01); *H04R 1/323* (2013.01); *H04R 5/023* (2013.01); *H04S 3/008* (2013.01); *B60N 2/879* (2018.02); *H04R 2201/025* (2013.01); *H04S 2400/01* (2013.01)

(58) Field of Classification Search
CPC .. A47C 7/727; A47C 7/72; A47C 7/44; A47C 7/68; A47C 7/70; H04R 1/323; H04R 5/023; H04R 2201/025; H04R 1/025; H04R 1/026; H04S 3/008; H04S 2400/01; H04S 3/00; B60N 2/879
USPC .......................... 297/217.4, 217.5; 381/301
See application file for complete search history.

(56) References Cited

U.S. PATENT DOCUMENTS 3,976,162 A * 8/1976 Cummings .............. H04R 1/02
381/302
4,061,877 A * 12/1977 Phillips .................... H04R 5/02
381/387

(Continued)

FOREIGN PATENT DOCUMENTS

| | | |
|---|---|---|
| JP | H01-175092 U | 12/1989 |
| JP | H0681197 U | * 11/1994 |

(Continued)

OTHER PUBLICATIONS

International Search Report issued in PCT/KR2021/010465; dated Nov. 8, 2021.

(Continued)

*Primary Examiner* — Robert Canfield
(74) *Attorney, Agent, or Firm* — Studebaker & Brackett PC

(57) ABSTRACT

The present invention relates to a chair including a multi-channel sound system, and more particularly, to a chair including a multi-channel sound system capable of providing a sense of space and a three-dimensional effect to a user who sits in the chair through sounds output from a plurality of channels.

9 Claims, 17 Drawing Sheets

(56) References Cited

U.S. PATENT DOCUMENTS

| | | | | |
|---|---|---|---|---|
| 4,075,438 A * | 2/1978 | Kappel | ................... | H04R 5/023 |
| | | | | 381/301 |
| 4,210,784 A * | 7/1980 | Phillips | ................... | H04R 5/023 |
| | | | | 381/387 |
| 5,169,210 A * | 12/1992 | Fricano | ..................... | A47C 7/70 |
| | | | | 297/188.21 |
| 5,282,251 A * | 1/1994 | Petersen | ................ | A47C 7/727 |
| | | | | 381/301 |
| 5,889,875 A * | 3/1999 | Caron | ..................... | A47C 7/727 |
| | | | | 381/345 |
| 6,145,926 A * | 11/2000 | Lin | ......................... | A47C 7/723 |
| | | | | 297/217.3 |
| 6,419,321 B1 * | 7/2002 | Sack | ........................ | A61G 5/12 |
| | | | | 297/405 |
| 8,950,813 B2 * | 2/2015 | Nawaz | ................... | B60N 2/885 |
| | | | | 297/398 |
| 9,700,146 B1 * | 7/2017 | Emerson | ................ | A47C 7/727 |
| 2001/0026087 A1 * | 10/2001 | Tomita | ...................... | A47C 7/72 |
| | | | | 297/217.4 |
| 2004/0100132 A1 * | 5/2004 | Sligh | ....................... | G10D 13/28 |
| | | | | 297/186 |
| 2004/0172887 A1 * | 9/2004 | Moglin | .................... | A47C 7/72 |
| | | | | 52/36.1 |
| 2005/0168021 A1 * | 8/2005 | Real | ...................... | A47C 15/004 |
| | | | | 297/217.3 |
| 2006/0103187 A1 * | 5/2006 | May | ....................... | A47C 7/546 |
| | | | | 297/188.2 |
| 2006/0284459 A1 * | 12/2006 | Real | ........................ | A47C 7/72 |
| | | | | 297/217.3 |
| 2007/0101604 A1 * | 5/2007 | Brazier | .................. | A45D 20/42 |
| | | | | 34/96 |
| 2008/0073953 A1 * | 3/2008 | Tamara | ..................... | A47C 7/72 |
| | | | | 297/217.4 |
| 2008/0187156 A1 * | 8/2008 | Yokota | .................. | H04R 1/025 |
| | | | | 381/307 |
| 2009/0154737 A1 * | 6/2009 | Ostler | ...................... | A47C 7/72 |
| | | | | 381/301 |
| 2011/0031785 A1 * | 2/2011 | Steenson | ................ | A47C 7/543 |
| | | | | 297/161 |
| 2012/0267923 A1 * | 10/2012 | Bouche | .................... | A47C 7/68 |
| | | | | 297/161 |
| 2013/0208906 A1 * | 8/2013 | Asao | ................ | G10K 11/17854 |
| | | | | 381/71.4 |
| 2013/0248669 A1 * | 9/2013 | Liu | ..................... | F16M 11/2092 |
| | | | | 248/226.11 |
| 2014/0151516 A1 * | 6/2014 | Liu | ......................... | H04R 1/026 |
| | | | | 248/124.1 |
| 2015/0241041 A1 * | 8/2015 | Youngberg | ............... | A47C 7/68 |
| | | | | 108/150 |
| 2017/0088266 A1 * | 3/2017 | Tracy | ................ | B64D 11/00154 |
| 2018/0310086 A1 * | 10/2018 | Tracy | ................... | H04R 1/2803 |
| 2019/0149907 A1 * | 5/2019 | Größler | ..................... | H04R 1/26 |
| | | | | 381/335 |
| 2019/0239012 A1 * | 8/2019 | Wong | ........................ | H04R 5/02 |
| 2020/0155793 A1 * | 5/2020 | Chen | ..................... | H04R 1/2803 |
| 2020/0164270 A1 * | 5/2020 | Lin | ......................... | A63F 13/26 |
| 2021/0127841 A1 * | 5/2021 | Park | ....................... | A47C 7/727 |
| 2021/0266427 A1 * | 8/2021 | Kidakarn | ............... | H04N 23/57 |
| 2022/0248859 A1 * | 8/2022 | Park | ........................ | A47C 7/723 |
| 2022/0395101 A1 * | 12/2022 | Park | ........................ | B60N 2/879 |
| 2023/0054544 A1 * | 2/2023 | Park | ........................ | A47C 7/727 |
| 2023/0059033 A1 * | 2/2023 | Park | ........................ | H04R 1/025 |
| 2023/0148758 A1 * | 5/2023 | Park | ........................ | A47C 7/72 |
| | | | | 297/217.4 |

FOREIGN PATENT DOCUMENTS

| | | | | | |
|---|---|---|---|---|---|
| JP | 2002-253384 A | | 9/2002 | | |
| JP | 2002253384 A | * | 9/2002 | | |
| JP | 2021069927 A | * | 5/2021 | ............. | A47C 7/38 |
| KR | 10-2003-0088330 A | | 11/2003 | | |
| KR | 10-1991425 B1 | | 6/2019 | | |
| KR | 101991425 B1 | * | 6/2019 | ............. | A61B 5/128 |
| WO | WO-0065961 A1 | * | 11/2000 | ............... | A47C 7/70 |
| WO | WO-2020130761 A1 | * | 6/2020 | ............. | A61B 5/128 |

OTHER PUBLICATIONS

"Request for the Submission of an Opinion" Office Action issued in KR 10-2020-0101112; mailed by the Korean Intellectual Property Office dated Oct. 22, 2021.

"Written Decision on Registration" Office Action issued in KR 10-2020-0101112; mailed by the Korean Intellectual Property Office dated Jan. 21, 2022.

ButtKicker. ButtKicker Gamer2. thebuttkicker. [online]. Sep. 23, 2017.

* cited by examiner

CHAIR INCLUDING MULTI-CHANNEL SOUND SYSTEM

CROSS-REFERENCE TO RELATED APPLICATION

This application is based on the PCT Application No. PCT/KR2021/010465, filed on Aug. 9, 2021, and claims the benefit of priority from the prior Korean Patent Application No. 10-2020-0101112, filed on Aug. 12, 2020, the disclosure of which is incorporated herein by reference in its entirety.

BACKGROUND

1. Field of the Invention

The present invention relates to a chair including a multi-channel sound system, and more particularly, to a chair including a multi-channel sound system capable of providing a sense of space and a three-dimensional effect to a user who sits in the chair through sounds output from a plurality of channels.

2. Discussion of Related Art

In general, a speaker used while being connected to a computer generates sound by converting a current flowing through a wire into an electrical signal and a vibration signal and generating vibrations using a vibration portion.

For example, when watching a movie or playing a game using a computer, a user not only watches images on a screen of the computer but also listens to sounds due to an electrical signal being transferred and vibrations generated by a speaker corresponding to the images being transferred to ears of the user while the user sits in a chair where a monitor of the computer is seen.

Particularly, a multi-channel sound system including a plurality of such speakers has an advantage of allowing a user to more exquisitely experience a direction, level, and the like of a sound in an image.

However, in order to implement such multi-channel sound systems, it is necessary to provide a plurality of speakers above and below a desk, behind a chair, and the like and to electrically connect all of the plurality of speakers such that there is a great restriction in space.

Also, although a multi-channel sound system is implemented by arranging the plurality of speakers, there is a problem that a position of the chair is changed or a variety of physical interferences are present between the speakers and the user who sits in the chair.

SUMMARY OF THE INVENTION

The present invention is directed to providing a chair including at least 1) a backrest portion configured to support a back and waist part of a user and 2) a seat portion configured to support a buttocks part and a part of legs of the user, the chair in which a multi-channel sound system is implemented by installing a frame, which has a speaker installation area in which at least one speaker is installed defined therein, on the backrest portion and/or the seat portion.

According to one aspect of the present invention, there is provided a chair including at least 1) a backrest portion configured to support a back and waist part of a user and 2) a seat portion configured to support a buttocks part and a part of legs of the user, the chair including at least one frame installed on the seat portion, wherein the frame is provided to extend in a predetermined direction, and a speaker installation area in which at least one speaker is installed is defined in one end portion of the frame.

In one embodiment, a frame rotating shaft may be positioned inside or below the seat portion, and the frame may be provided to be connected to the frame rotating shaft to be rotatable within a predetermined angle range on a plane.

According to the present invention, there is an advantage that a user can experience vivid sounds like those existing in actually reproduced images or game environments just by sitting in a chair.

In particular, since it is possible to transfer generated sounds to the user while the sounds are separated in a variety of directions such as frontward, rearward, sideward, upward, downward directions, and the like in reproduced images or game environments according to positions and the number of speakers provided in the chair, a true multi-channel sound system can be implemented.

DETAILED DESCRIPTION OF EXEMPLARY EMBODIMENTS

Hereinafter, a chair including a multi-channel sound system according to some embodiments of the present invention will be described in detail with reference to the accompanying drawings.

Figure 1:
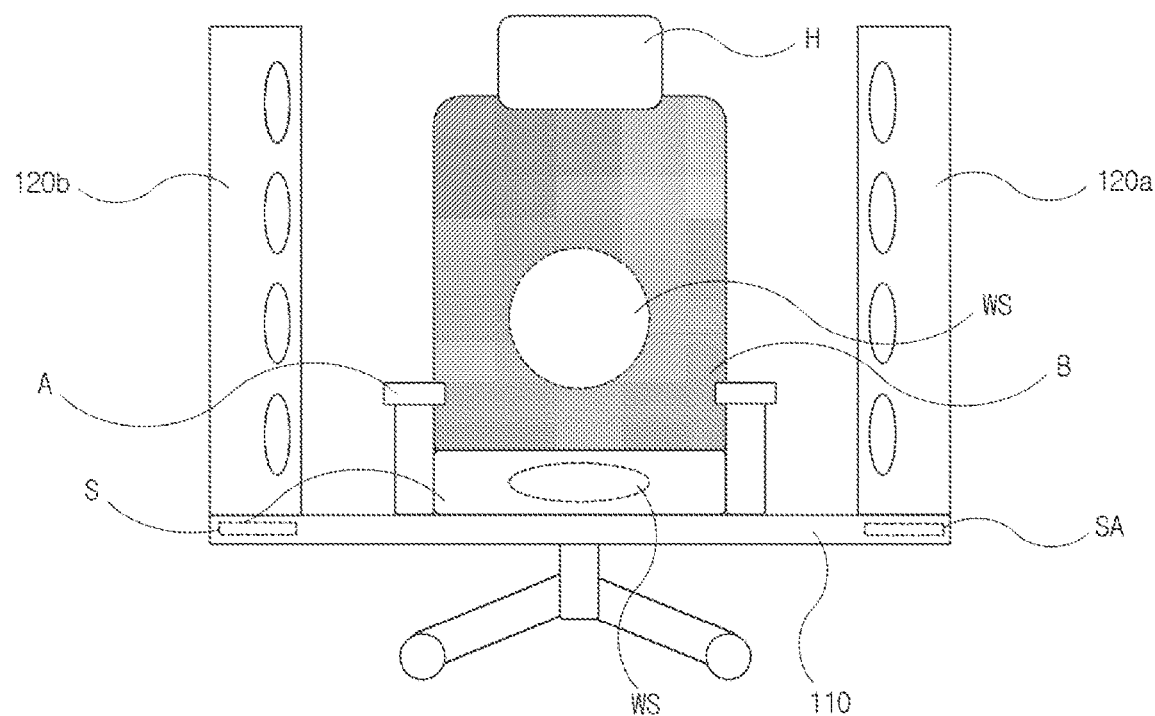
FIG. 1 is a front view of a chair according to one embodiment of the present invention.
Figure 2:
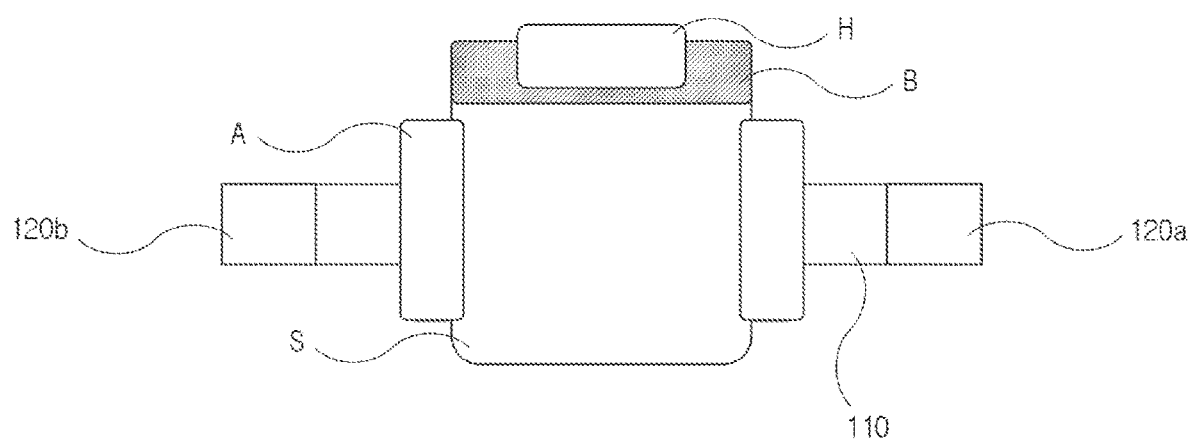
FIG. 2 is a top view of the chair illustrated in FIG. 1.

FIG. 1 is a front view of a chair according to one embodiment of the present invention, and FIG. 2 is a top view of the chair illustrated in FIG. 1.

Referring to FIGS. 1 and 2, a chair 100 includes a backrest portion B configured to support a back and waist part of a user who sits in the chair 100 and a seat portion S configured to support a buttocks part and a part of legs of the user. Also, in some cases, a headrest portion H may be installed above the backrest portion B. Here, the headrest portion H may be configured to be detachable from the backrest portion B or integrally formed with the backrest portion B as necessary.

Also, although the chair 100 is illustrated as a movable chair, in which a movable member is provided below the seat portion S, in the accompanying drawings, the present invention is not necessarily limited thereto, and it should be understood that the chair 100 may also be provided in the form of an immovable chair, such as a sofa.

Also, the chair 100 may further include side support portions A configured to support sides of the user who sits in the chair 100. The side support portions A may be so-called armrests and may be provided as portions configured to support arms of the user.

For comfort of the user who sits in the chair, the headrest portion H, the backrest portion B, and the seat portion S may be provided in the form in which a front or inside (that is, a part which comes into contact with the back, waist, and side parts of the user) is formed of a cushioning material or has a cushioning material added thereon.

Also, a woofer speaker WS may be additionally provided on the front or inside of the backrest portion B and/or the seat portion S. Since vibrations generated by the woofer speaker WS may be directly transferred to the user who sits in the chair 100, there is an advantage that a more vivid user experience can be provided.

Meanwhile, at least one frame 110 provided to extend in a predetermined direction may be installed on the seat portion S, and a speaker installation area in which at least one speaker is installed may be defined in one end portion of the frame.

For example, referring to FIGS. 1 and 2, the frame 110 extending in a direction crossing both sides of the chair 100 may be installed below the seat portion S, a speaker installation area SA may be defined in each of both end portions of the frame 110, and speakers 120a and 120b may be installed in the speaker installation areas SA.

Here, "below the seat portion S" may refer to a bottom surface of the seat portion S, and here, the frame 110 may be installed on the bottom surface of the seat portion S.

The speakers 120a and 120b may be speakers in the form of a complete product, speaker units connected to driving portions separately provided at the speaker installation areas SA and configured to operate as a complete product, display type speakers, thin-film type speakers, or one-way and multi-way speakers, and the speakers 120a and 120b may operate by receiving sound signals through wires or wirelessly.

Although not separately illustrated in the drawings, in a case in which the speakers receive sounds wirelessly, the chair 100 may include a wireless reception portion. The wireless reception portion may wirelessly transmit or receive sound signals to or from a sound source (for example, home theater, TV, set-top box, sound bar, computer, cellular phone, tablet PC, or the like) using a method such as Wi-Fi, Bluetooth, digital enhanced cordless telecommunications (DECT), Li-Fi, and the like.

Also, the speakers 120a and 120b may be directly installed in the speaker installation areas SA, but the present invention is not necessarily limited thereto, and a separate speaker installation stand, which will be described below, may be interposed between the speaker installation areas SA and the speakers 120a and 120b.

Meanwhile, for convenience, the frame 110 is illustrated as having a linear shape, but the frame 110 may have a nonlinear shape, e.g., various shapes such as a broken-line shape or a curved shape.

Figure 3:
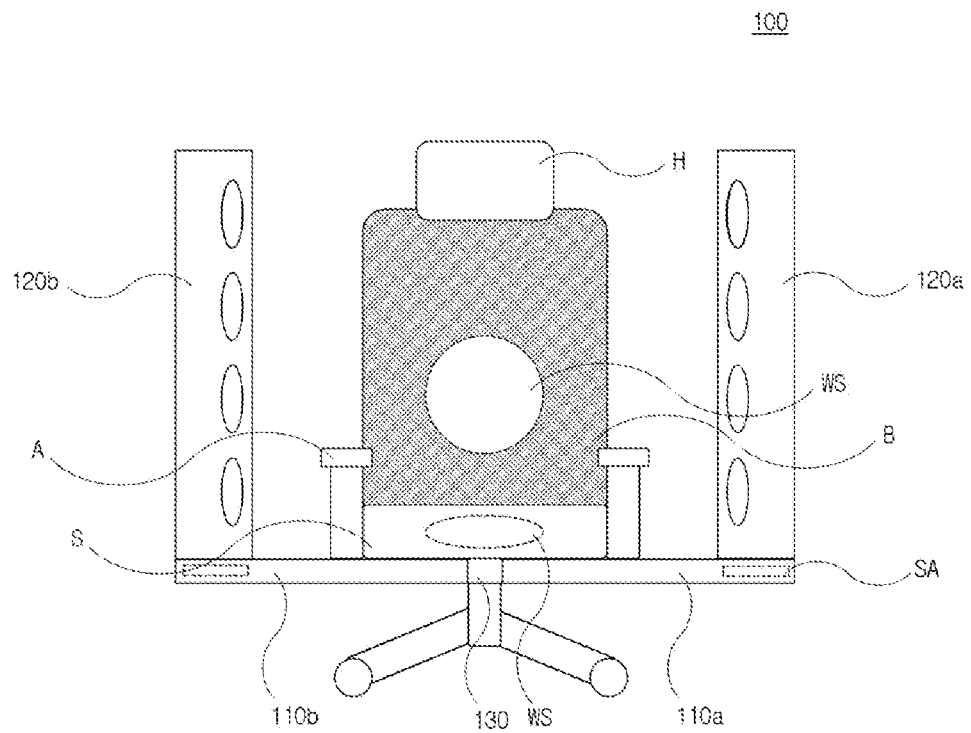
FIG. 3 is a front view of a chair according to another embodiment of the present invention.
Figure 4:
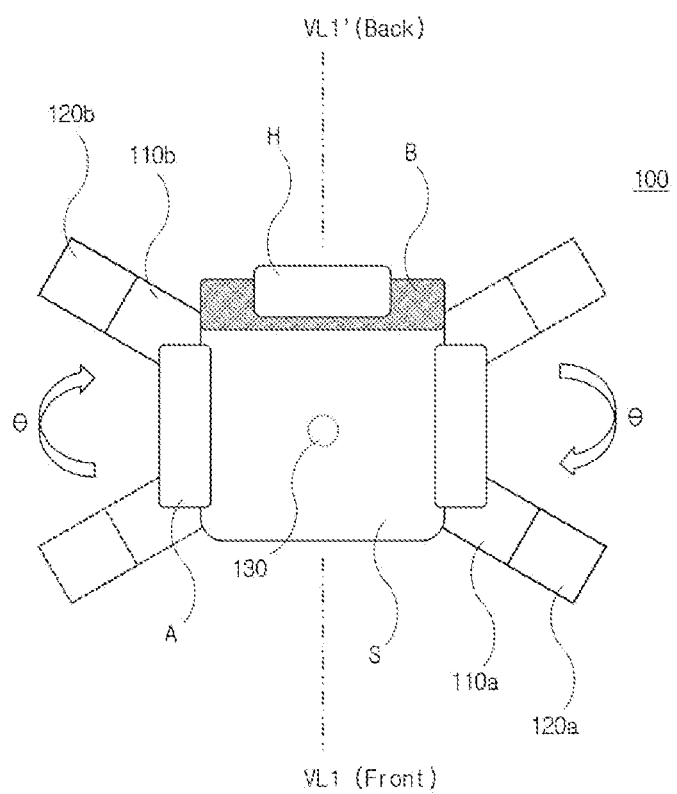
FIGS. 4 to 6 are top views illustrating various modified examples of the chair illustrated in FIG. 3.

Referring to FIG. 3, which is a front view of a chair according to another embodiment of the present invention, and FIG. 4, in a case in which the frame 110 is installed at the seat portion S, a frame rotating shaft 130 may be positioned inside or below the seat portion S, and the frame 110 may be provided to be connected to the frame rotating shaft 130 to be rotatable within a predetermined angle range on a plane.

Here, the frame 110 may pass through the center of the chair 100 and may include at least one left side frame 110a positioned at the left side with respect to a virtual reference line VL1-VL1' connecting the front and rear of the chair 100 and at least one right side frame 110b positioned at the right side with respect to the virtual reference line VL1-VL1'. Likewise, the speaker installation area SA may be defined in one end portion of each of the left side frame 110a and the right side frame 110b, and the speakers 120a and 120b may be installed above the speaker installation areas SA.

Accordingly, the left side frame 110a may rotate about the frame rotating shaft 130 so that the speaker 120a installed at one end portion of the left side frame 110a may be positioned within a predetermined radial range in an area ranging from the front to rear of a left side of the user who sits in the chair 100.

Also, the right side frame 110b may rotate so that the speaker 120b installed at one end portion of the right side frame 110b may be positioned within a predetermined radial range in an area ranging from the front to rear of a right side of the user who sits in the chair 100.

Here, the left side frame 110a and the right side frame 110b may each be provided as an independent frame but may also be provided as a single frame partitioned into portions rotatable about the same rotating shaft or different rotating shafts. That is, the frame 110 may be partitioned into the left side frame 110a and the right side frame 110b rotatable about the same rotating shaft or different rotating shafts.

Although not separately illustrated in the drawings, in order to prevent the chair 100 from losing balance and falling due to the weight of the speakers 120 installed in the frames 110, a weight compensating member may be installed in the chair 100. The weight compensating member may be installed on an additionally extending frame portion which is formed by additionally extending the frame in a direction opposite to the speaker about the frame rotating shaft which will be described below. Meanwhile, to allow the center of mass of the chair 100 to be maintained even when the weight of the speakers 120 is added, the weight compensating member may be installed on the seat portion S or a lower support stand (for example, a support structure including a wheel) configured to support a bottom of the seat portion S, or a load of the seat portion S or the lower support stand supporting the bottom of the seat portion S may be increased.

Also, the frame 110 may be made of a lightweight rigid material such as carbon fibers.

Figure 5:
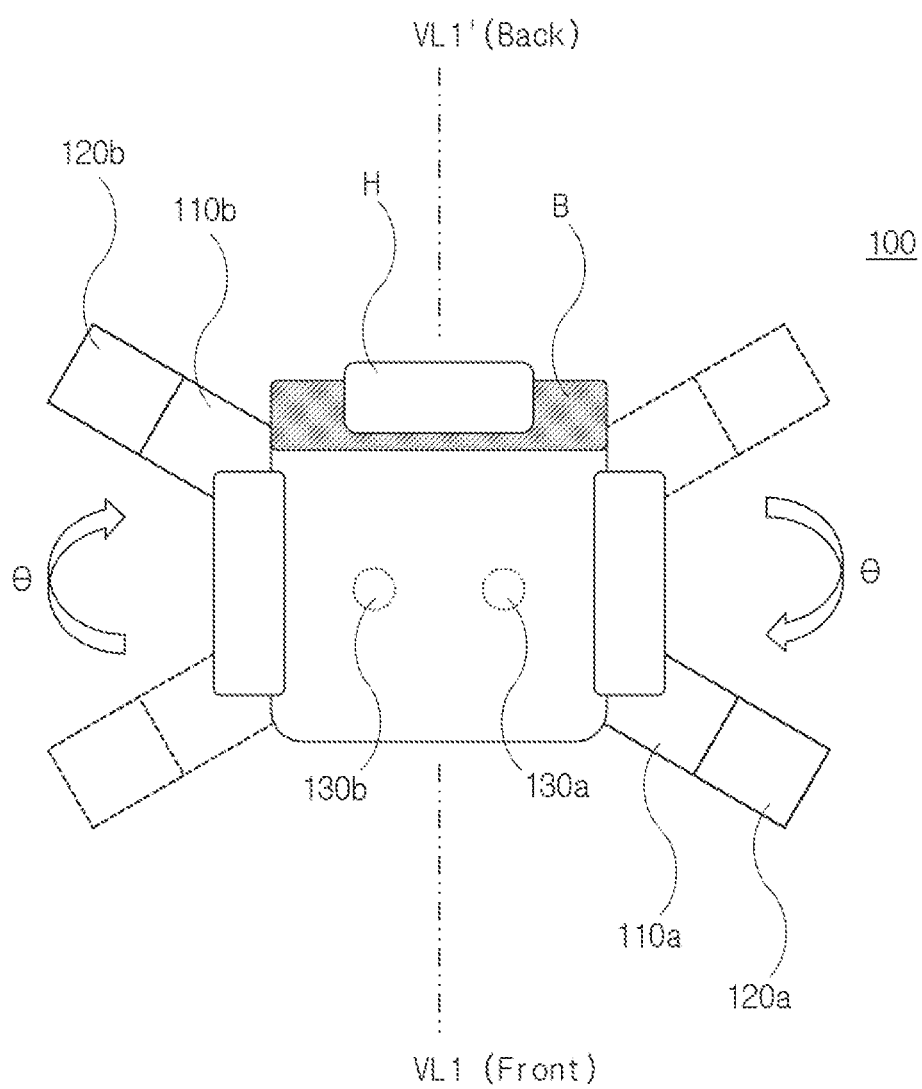

Meanwhile, referring to FIG. 5 illustrating another modified example of the present invention, the frame rotating shaft 130 may include at least one left side frame rotating shaft 130*a* to which the at least one left side frame 110*a* is connected and at least one right side frame rotating shaft 130*b* to which the at least one right side frame 110*b* is connected.

That is, since the at least one left side frame 110*a* is connected to the left side frame rotating shaft 130*a*, and the at least one right side frame 110*b* is connected to the right side frame rotating shaft 130*b*, a structural complexity problem that may occur as the plurality of frames 110 are connected to the single rotating shaft 130 can be solved.

Figure 6:
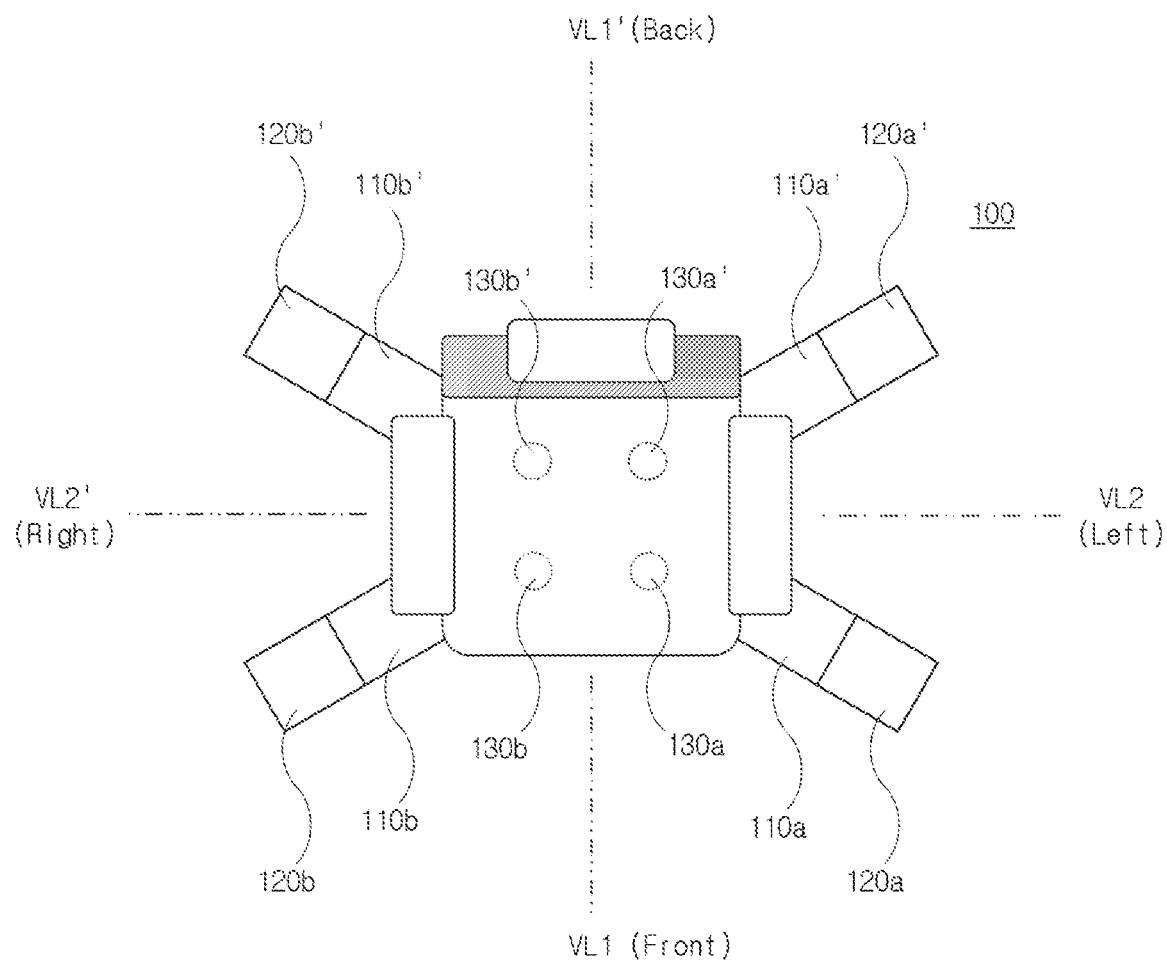

Also, referring to FIG. 6, the left side frame 110*a* and the right side frame 110*b* may be provided as a plurality of left side frames 110*a* and a plurality of right side frames 110*b*.

Specifically, the left side frame 110*a* may pass through the center of the chair 100 and may include at least one front frame 110*a* positioned at the front with respect to a virtual reference line VL2-VL2' connecting both sides of the chair 100 and at least one rear frame 110*a*' positioned at the rear with respect to the virtual reference line VL2-VL2', and the right side frame 110*b* may pass through the center of the chair 100 and may include at least one front frame 110*b* positioned at the front with respect to the virtual reference line VL2-VL2' and at least one rear frame 110*b*' positioned at the rear with respect to the virtual reference line VL2-VL2'.

Here, the left side front frame 110*a* and the left side rear frame 110*a*' may be connected to the left side frame rotating shaft 130*a* and a left side frame rotating shaft 130*a*', respectively, and the right side front frame 110*b* and the right side rear frame 110*b*' may be connected to the right side frame rotating shaft 130*b* and a right side frame rotating shaft 130*b*', respectively.

Likewise, the left side frame rotating shaft 130*a* and the right side frame rotating shaft 130*b* may be provided as a plurality of left side frame rotating shafts 130*a* and a plurality of right side frame rotating shafts 130*b*.

Specifically, the left side frame rotating shaft 130*a* and the right side frame rotating shaft 130*b* may pass through the center of the chair 100 and may each include front frame rotating shafts 130*a* and 130*b* positioned at the front with respect to the virtual reference line VL2-VL2' connecting both sides of the chair 100 and to which at least one of the installed left side frames 110*a* and right side frames 110*b* is connected and rear frame rotating shafts 130*a*' and 130*b*' positioned at the rear with respect to the virtual reference line VL2-VL2' and to which at least one of the installed left side frames 110*a* and right side frames 110*b* is connected.

More specifically, the left side front frame 110*a* may be connected to the left side front frame rotating shaft 130*a*, the left side rear frame 110*a*' may be connected to the left side rear frame rotating shaft 130*a*', the right side front frame 110*b* may be connected to the right side front frame rotating shaft 130*b*, the right side rear frame 110*b*' may be connected to the right side rear frame rotating shaft 130*b*'.

Accordingly, the speaker 120*a*' is also installed in the left side rear frame 110*a*', and the speaker 120*b*' is also installed in the right side rear frame 110*b*'.

That is, the structural complexity problem can be solved by connecting a single frame to a single frame rotating shaft, and here, an angle of rotation of the single frame connected to the single frame rotating shaft may be set to 90° so that a plurality of frames in which a speaker installation area is defined in one end portion may be positioned to be appropriately distributed around the user who sits in the chair 100.

FIGS. 7 to 11 illustrate various modified examples of a frame applied to the chair according to the present invention. Although a single frame 110 is illustrated in FIGS. 7 to 11, operations of the frame 110 to be described using FIGS. 7 to 11 may be equally applied to an example in which the frame 110 is provided as a plurality of frames 110 in the chair 100 (for example, the case illustrated in FIG. 6 in which the left side front frame 110*a*, the left side rear frame 110*a*', the right side front frame 110*b*, and the right side rear frame 110*b*' are provided).

Figure 7:
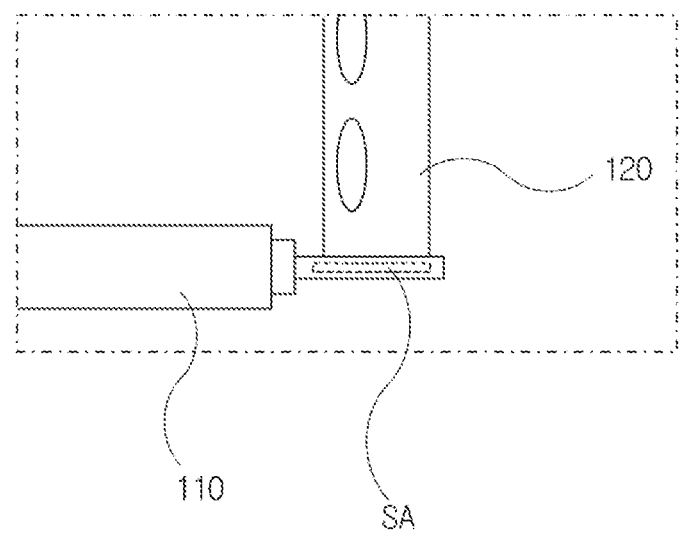
FIGS. 7 to 11 illustrate various modified examples of a frame applied to the chair according to the present invention.
Figure 8:
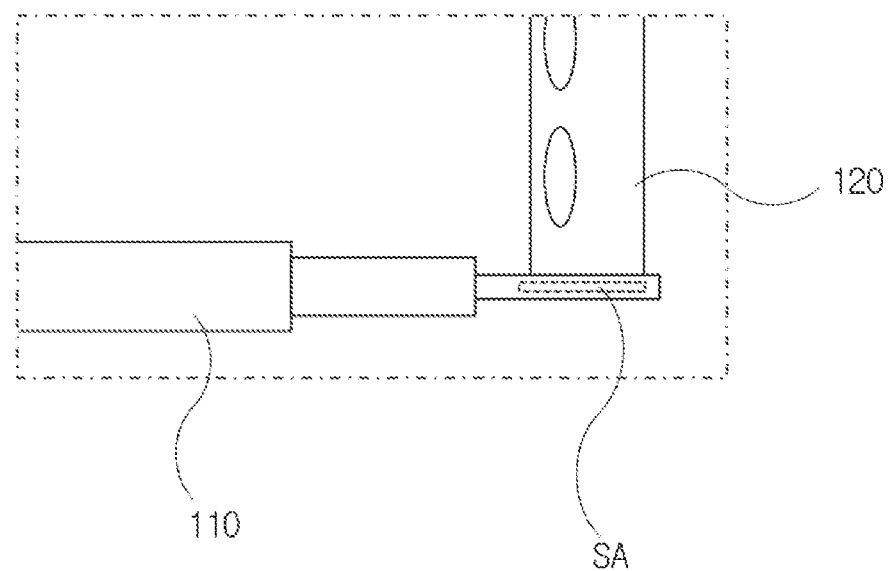

First, referring to FIGS. 7 and 8, the frame 110 may be provided so that a length at which the frame 110 extends is adjustable from the other end portion thereof connected to the frame rotating shaft 130. Here, the length at which the frame 110 extends may be adjusted as the other end portion of the frame 110 is folded or unfolded in a multi-stage manner.

Figure 9:
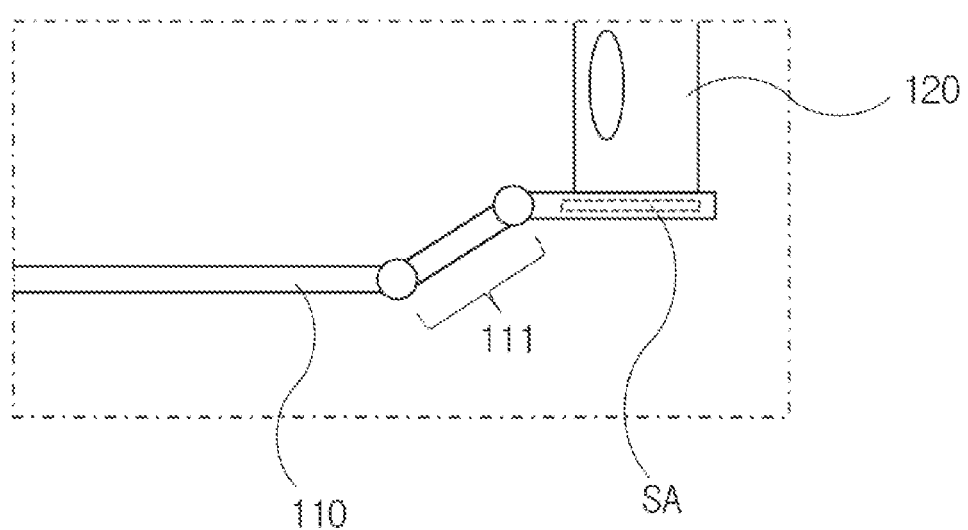

Also, referring to FIG. 9, one end portion of the frame 110 may be provided to move upward or downward by a tilting device 111. Here, the tilting device 111 may have a joint structure so that one end portion of the speaker installation area SA, in which at least one speaker 120 is installed, can be tilted from a horizontal state. In sofa type chairs such as a recliner, the joint structure is effective in adjusting the speaker 120 to stay level while the chair is reclined.

Figure 10:
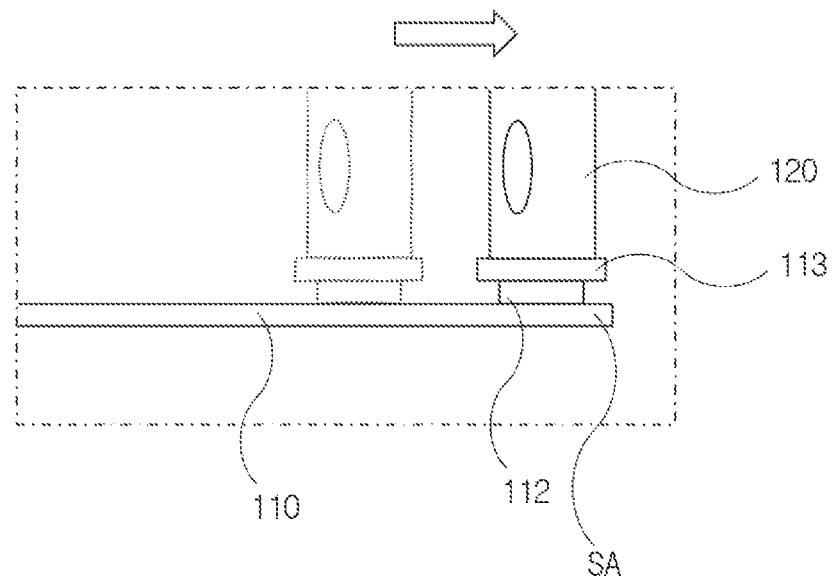
Figure 11:
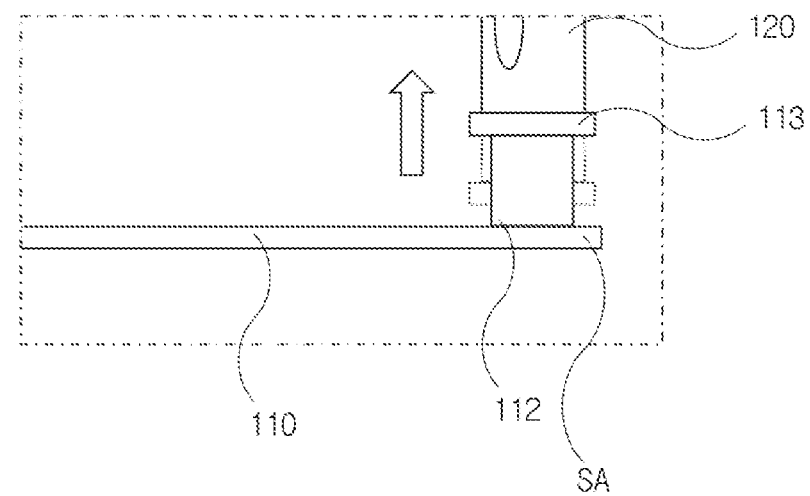

Also, referring to FIG. 10, a speaker rotating shaft 112 and a speaker installation stand 113 provided to be connected to the speaker rotating shaft 112 to be rotatable may be provided in the speaker installation area SA defined in one end portion of the frame 110, and the speaker 120 may be installed on the speaker installation stand 113 to be axially rotatable.

Also, as illustrated in FIG. 10, the speaker rotating shaft 112 may be provided to be able to slide a predetermined length in a direction in which the frame 110 extends. Accordingly, the position of the speaker 120 installed in the frame 110 may be adjusted in the direction in which the frame 110 extends.

Additionally, the speaker rotating shaft 112 may operate as a speaker lifting/lowering shaft, and accordingly, the speaker installation stand 113 may be able to move upward or downward with respect to the speaker rotating shaft 112.

Figure 12:
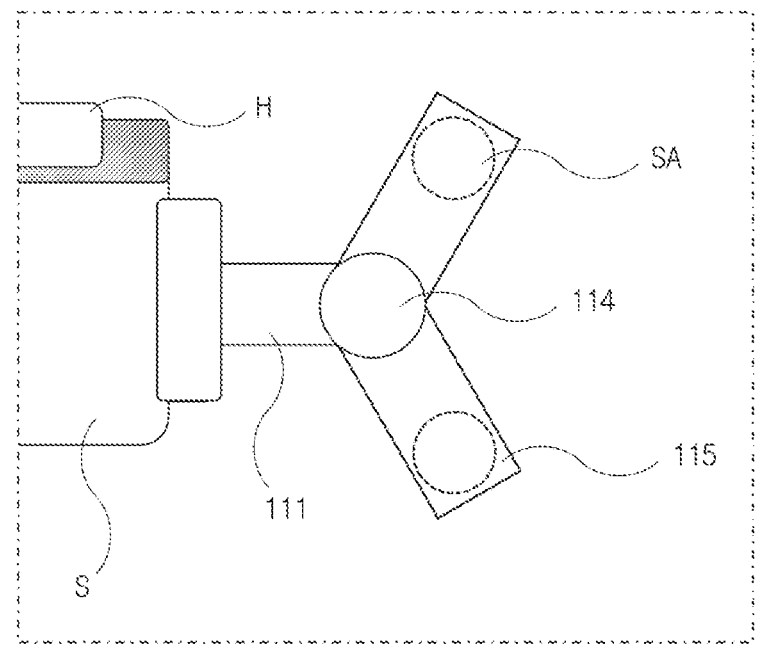
FIGS. 12 to 14 are top views illustrating a portion of the chair according to some embodiments of the present invention.
Figure 13:
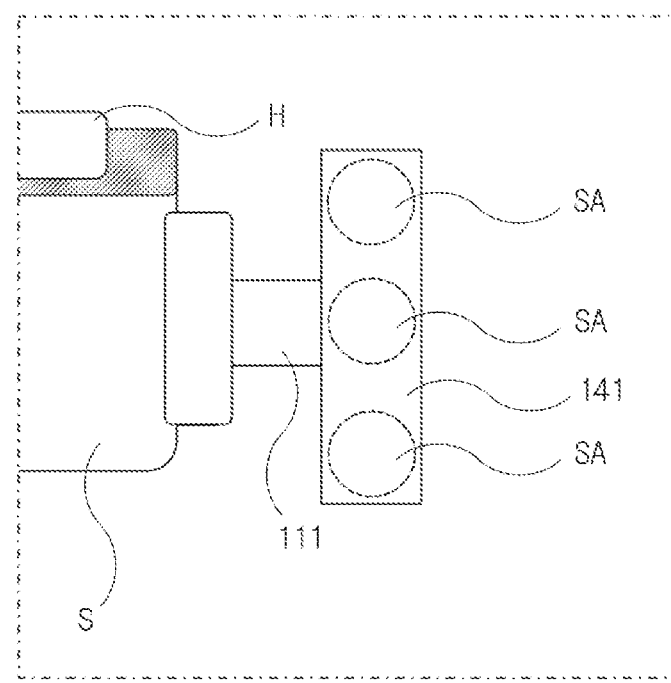
Figure 14:
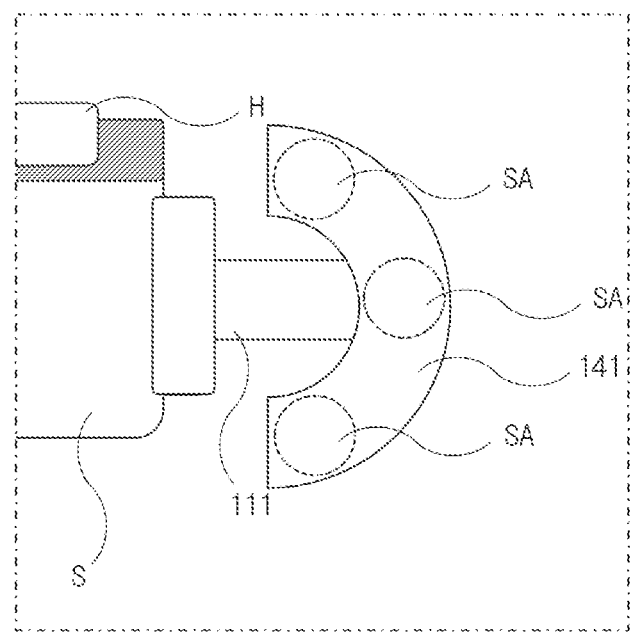
Figure 15:
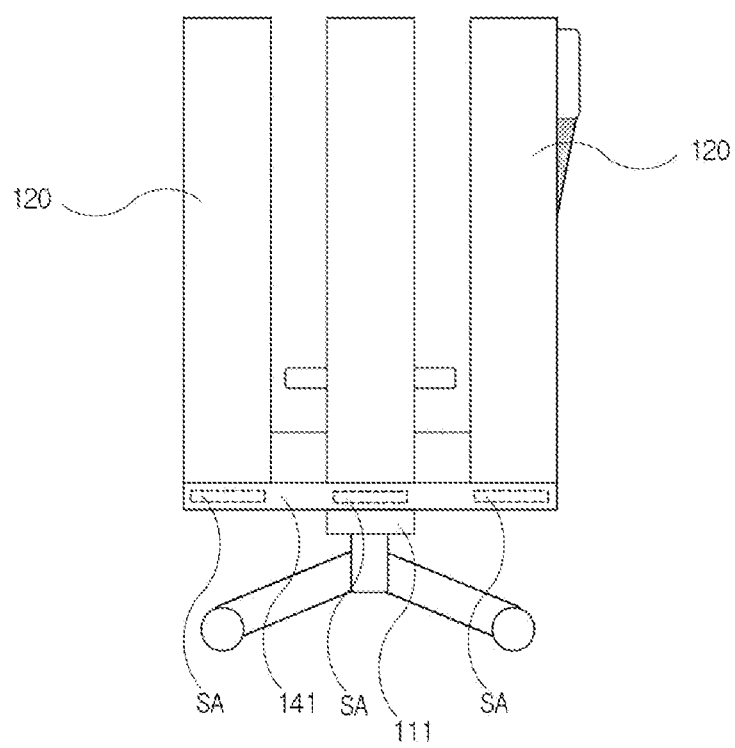
FIGS. 15 to 17 are lateral views of the chair according to some embodiments of the present invention.
Figure 16:
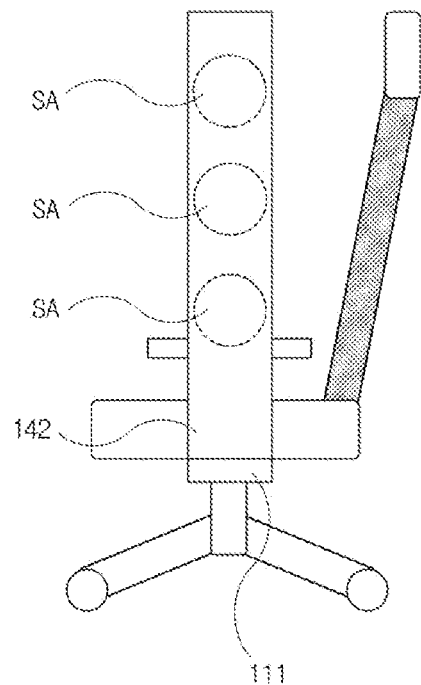
Figure 17:
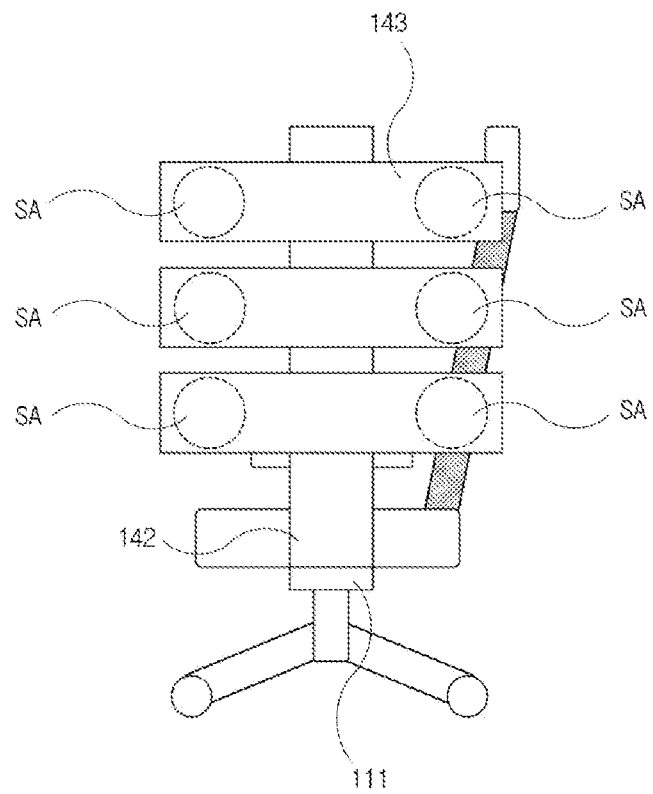

FIGS. 12 to 14 are top views illustrating a portion of the chair according to some embodiments of the present invention, and FIGS. 15 to 17 are lateral views of the chair according to some embodiments of the present invention.

Referring to FIG. 12, the frame 110 includes a fixing frame 111 which has one end portion fixed to the chair 100 or the rotating shaft 130 and is provided to extend in a predetermined direction, and a frame rotating shaft 114 is provided on the other end portion of the fixing frame 111. At least one rotating frame 115 may be installed on the frame rotating shaft 114, and the rotating frame 115 may be provided to have one end portion connected to the frame rotating shaft 114 to be rotatable within a predetermined angle range on a plane.

The speaker installation area SA in which at least one speaker is installed may be defined in the other end portion of the rotating frame 115.

Likewise, the fixing frame 111 may be provided so that a length at which the fixing frame 111 extends is adjustable from the other end portion thereof connected to the frame rotating shaft 114. A method of adjusting the length at which the fixing frame 111 extends may be the same as the method illustrated in FIGS. 7 and 8.

Meanwhile, referring to FIGS. 13 to 15, the frame 110 includes the fixing frame 111 which has one end portion fixed to the chair 100 or the rotating shaft 130 and is provided to extend in a predetermined direction, and a transverse auxiliary frame 141 provided to, on a horizontal plane, extend to intersect a direction in which the fixing frame 111 extends may be provided on the other end portion of the fixing frame 111. The speaker installation area SA in which at least one speaker 120 is installed is defined in the transverse auxiliary frame 141 in a direction in which the transverse auxiliary frame 141 extends.

Also, although not separately illustrated in the drawings, the fixing frame 111 and the transverse auxiliary frame 141 may be connected with a rotating shaft as a medium, and in this case, the transverse auxiliary frame 141 may be provided to be rotatable within a predetermined angle range on a plane in a state in which one portion of the transverse auxiliary frame 141 is fixed to the fixing frame 111 through the rotating shaft.

Meanwhile, the transverse auxiliary frame 141 may have a linear shape as illustrated in FIGS. 13 and 15 but may, referring to FIG. 14, also have a curved shape as described above.

Figure 18:
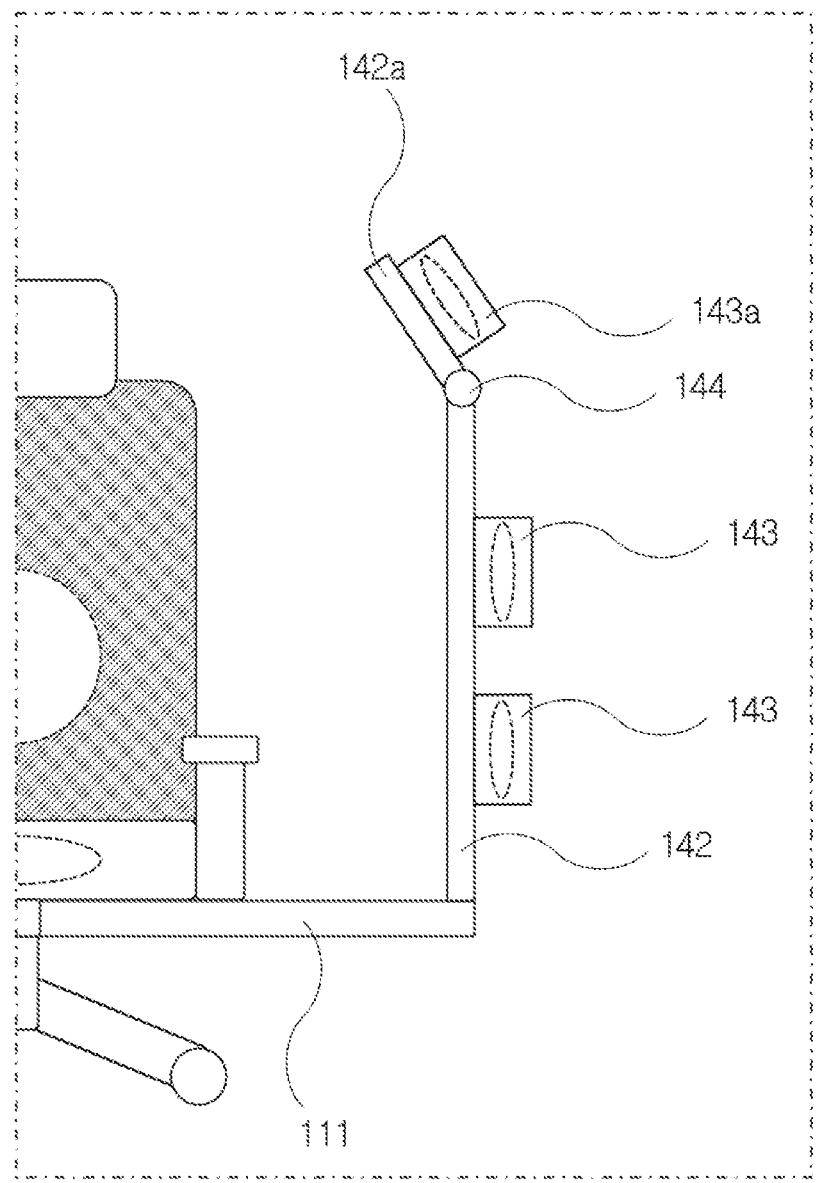
FIG. 18 is a front view illustrating a portion of a chair according to still another embodiment of the present invention.

Referring to other modified examples illustrated in FIGS. 16 to 18, the frame 110 includes the fixing frame 111 which has one end portion fixed to the chair 100 or the rotating shaft 130 and is provided to extend in a predetermined direction, and a longitudinal auxiliary frame 142 provided to, on a vertical plane, extend to intersect the direction in which the fixing frame 111 extends may be provided on the other end portion of the fixing frame 111. The speaker installation area SA in which at least one speaker 120 is installed is defined in the longitudinal auxiliary frame 142 in a direction in which the longitudinal auxiliary frame 142 extends.

Also, although not separately illustrated in the drawings, the fixing frame 111 and the longitudinal auxiliary frame 142 may be connected with a rotating shaft as a medium, and in this case, the longitudinal auxiliary frame 142 may be provided to be rotatable within a predetermined angle range on a plane in a state in which one portion of the longitudinal auxiliary frame 142 is fixed to the fixing frame 111 through the rotating shaft. Referring to FIG. 17, at least one transverse auxiliary frame 143 provided to, on a horizontal plane, extend to intersect the longitudinal auxiliary frame 142 in a direction in which the longitudinal auxiliary frame 142 extends may be installed on the longitudinal auxiliary frame 142, and in this case, the speaker installation area SA in which at least one speaker 120 is installed may be defined in a direction in which the transverse auxiliary frame 143 extends.

Also, referring to FIG. 18, one end portion 142a of the longitudinal auxiliary frame 142 that is not fixed to the fixing frame 111 may be provided to be able to be tilted by a tilting device 144, and accordingly, a transverse auxiliary frame 143a installed on the one end portion 142a of the longitudinal auxiliary frame 142 and the speaker 120 installed in the transverse auxiliary frame 143a may be disposed toward the user who sits in the chair 100.

Also, in a case in which the fixing frame 111 is positioned at the rear of the backrest portion B, and the one end portion 142a of the longitudinal auxiliary frame 142, which is provided to extend perpendicular to the direction in which the fixing frame 111 extends, extends in a direction toward a portion above the user, a speaker may be installed at the portion above the user by a configuration similar to that of a third headrest speaker frame which will be described below.

Figure 19:
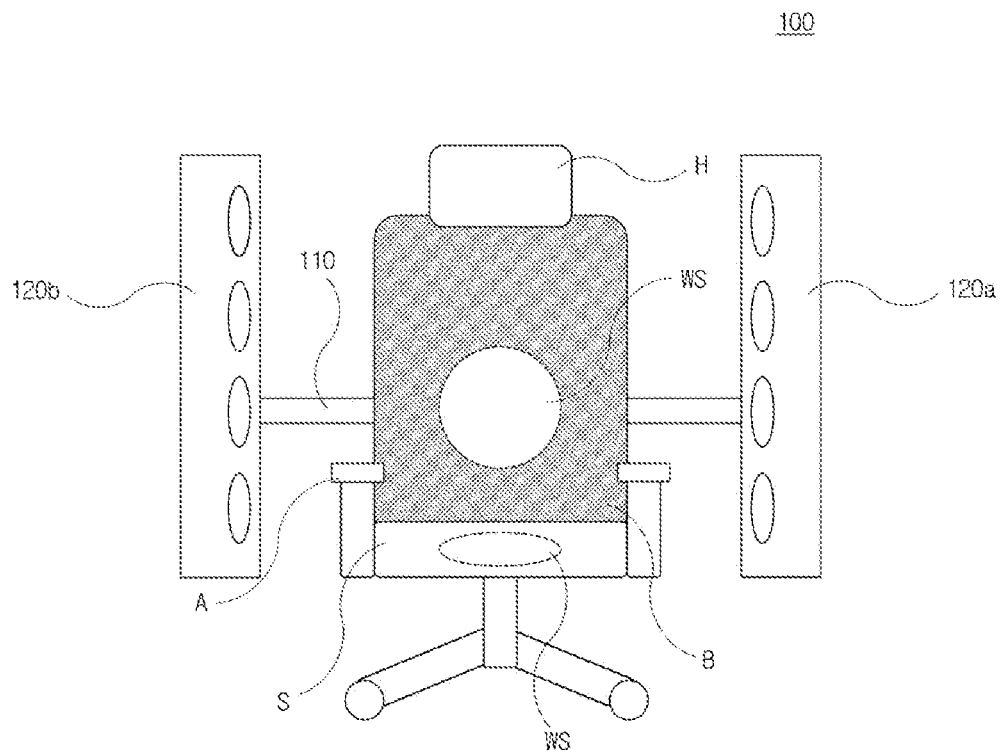
FIG. 19 is a front view of a chair according to yet another embodiment of the present invention.
Figure 20:
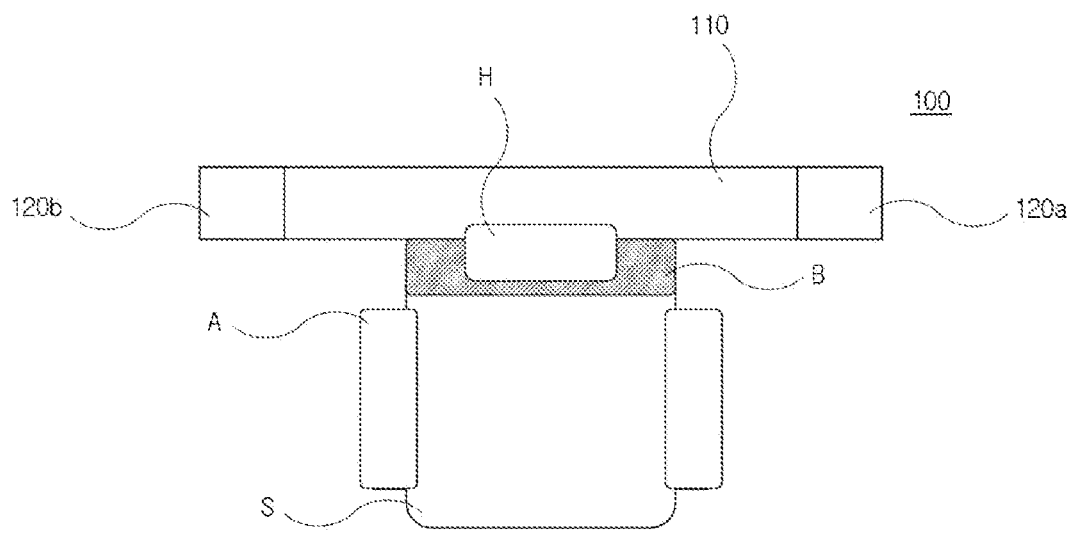
FIG. 20 is a top view of the chair illustrated in FIG. 19.
Figure 21:
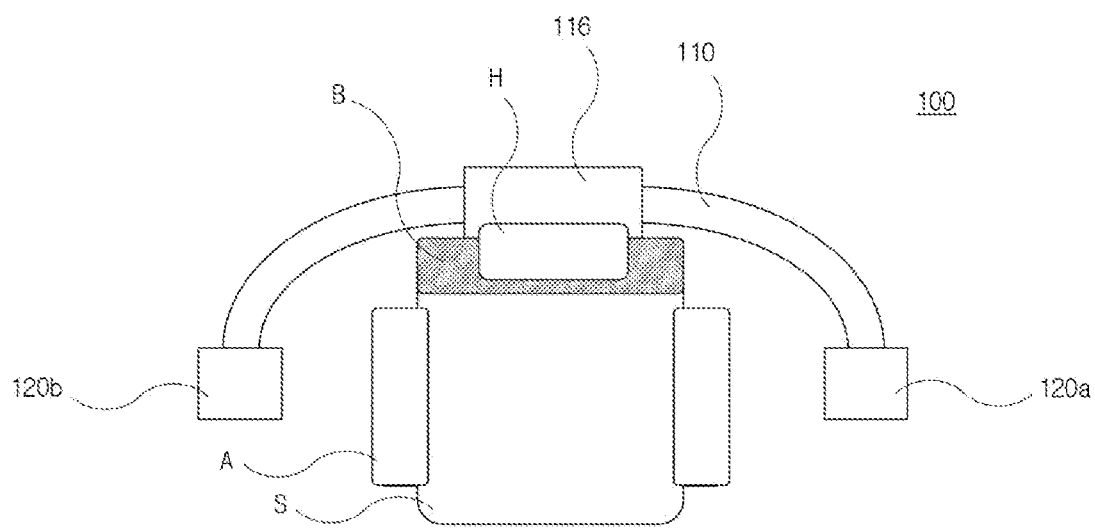
FIG. 21 is a top view illustrating a modified example of the chair illustrated in FIG. 19.

FIG. 19 is a front view of a chair according to yet another embodiment of the present invention, and FIGS. 20 and 21 are top views of the chair illustrated in FIG. 19.

Referring to FIGS. 19 to 21, the frame 110 extending in the direction crossing both sides of the chair 100 may be installed inside or behind the backrest portion B, the speaker installation area SA may be defined in each of both end portions of the frame 110, and the speakers 120a and 120b may be installed in the speaker installation areas SA. Here, the frame 110 may be fixed to side surfaces or rear surfaces of the speakers 120a and 120b.

Also, the frame 110 may be provided to be connected to a frame rotating shaft 116 to be rotatable within a predetermined angle range on a plane, and the frame 110 may have a shape that is bent or curved toward the front of the chair or may have a linear shape or an angular shape which has at least one joint structure in the middle.

Even in the case in which the frame 110 is installed inside or behind the backrest portion B, the configuration described in the embodiment in which the frame 110 is installed inside or behind the seat portion S may be equally applied within a scope that is not structurally limited, and an overlapping description in this case will be omitted for convenience.

Figure 22:
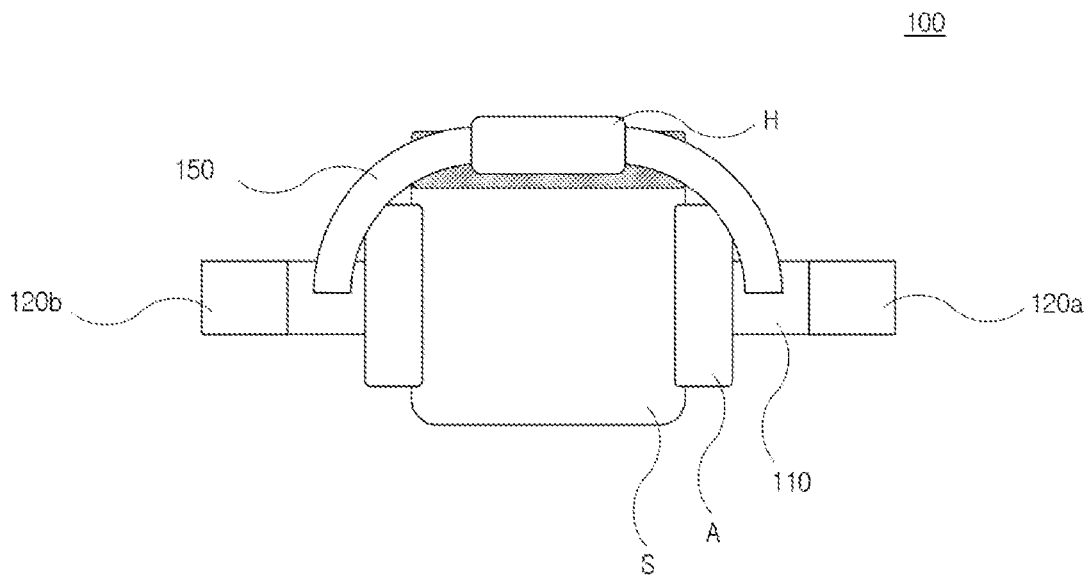
FIG. 22 is a top view of a chair according to yet another embodiment of the present invention.
Figure 23:
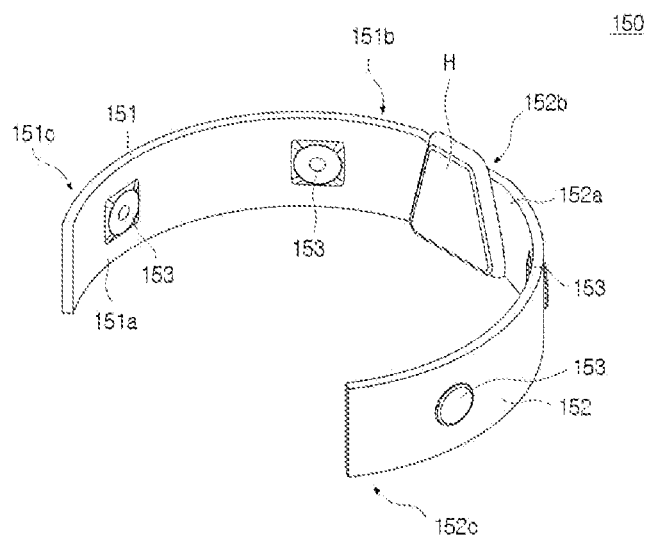
FIG. 23 is a perspective view illustrating a headrest portion of the chair illustrated in FIG. 22 and a headrest speaker frame installed on the headrest portion.

FIG. 22 is a top view of a chair according to yet another embodiment of the present invention, and FIG. 23 is a perspective view illustrating a headrest portion of the chair illustrated in FIG. 22 and a headrest speaker frame installed on the headrest portion.

The chair 100 may include the headrest portion H configured to support a head part of a user who sits in the chair 100, and here, the headrest portion H may be installed to be fixed to the chair 100, specifically, the backrest portion B of the chair 100, or be detachable therefrom.

Also, at least one headrest speaker frame 150 provided to extend from the headrest portion H toward the front of the chair 100 may be installed on the headrest portion H, and a speaker installation area in which at least one speaker is installed may be defined inside the headrest speaker frame 150 disposed toward the user who sits in the chair 100.

More specifically, the headrest speaker frame 150 includes a first headrest speaker frame 151 which is provided to extend in one direction of the headrest portion H and has at least one speaker 153 installed on an inner side 151a thereof and a second headrest speaker frame 152 which is provided to extend in the other direction of the headrest portion H and has at least one speaker 153 installed on an inner side 152a thereof.

The first headrest speaker frame 151 having a shape that extends in the one direction of the headrest portion H is provided on one side of the headrest portion H. At least one speaker 153 may be installed at the front or on the inner side 151a of the first headrest speaker frame 151.

In a case in which at least two speakers 153 are installed on the inner side 151a of the first headrest speaker frame 151, the two speakers 153 may be installed to be spaced apart from each other at a predetermined interval from one end 151b of the first headrest speaker frame 151 fixed to the headrest portion H toward one end 151c of the first headrest speaker frame 151 not fixed to the headrest portion H.

Likewise, the second headrest speaker frame 152 having a shape that extends in the other direction of the headrest portion H is provided on the other side of the headrest portion H. At least one speaker 153 may be installed at the front or on the inner side 152*a* of the second headrest speaker frame 152.

In a case in which at least two speakers 153 are installed on the inner side 152*a* of the second headrest speaker frame 152, the two speakers 153 may be installed to be spaced apart from each other at a predetermined interval from one end 152*b* of the second headrest speaker frame 152 fixed to the headrest portion H toward the other end 152*c* of the second headrest speaker frame 152 not fixed to the headrest portion H.

In one embodiment, the one end 151*b* of the first headrest speaker frame 151 and the one end 152*b* of the second headrest speaker frame 152 may be installed to be fixed to both sides of the headrest portion H, and the one end 151*c* of the first headrest speaker frame 151 and the other end 152*c* of the second headrest speaker frame 152, which are not fixed to the headrest portion H, may be provided to be inclined toward the front or inside of the headrest portion H.

In this way, by being provided to be inclined toward the front or inside of the headrest portion H, the one end 151*c* of the first headrest speaker frame 151 and the other end 152*c* of the second headrest speaker frame 152, which are not fixed to the headrest portion H, may allow sounds output from a plurality of speakers 121 and 131 installed in the first headrest speaker frame 151 and the second headrest speaker frame 152 to be further concentrated on the user.

Also, as the one end 151*c* of the first headrest speaker frame 151 and the other end 152*c* of the second headrest speaker frame 152, which are not fixed to the headrest portion H, are provided to be inclined toward the front or inside of the headrest portion H, it is possible to maintain a constant distance between the plurality of speakers 153 and the user who sits in the chair in which the headrest speaker frame 150 is installed.

The first headrest speaker frame 151 and the second headrest speaker frame 152 may have a shape that is bent or curved from the headrest portion H toward the front of the chair or may have a linear shape or an angular shape which has at least one joint structure in the middle.

Here, the one end 151*c* of the first headrest speaker frame 151 and the other end 152*c* of the second headrest speaker frame 152, which are not fixed to the headrest portion H, may be arranged to be inclined from the headrest portion H toward the front of the chair.

As described above, by the first headrest speaker frame 151 and the second headrest speaker frame 152 installed to extend from both sides of the headrest portion H and the plurality of speakers 121 and 131 installed in the first headrest speaker frame 151 and the second headrest speaker frame 152, a multi-channel sound system can be implemented by receiving and outputting a multi-channel sound signal from a separately-provided sound source (e.g., home theater, TV, set-top box, sound bar, computer, cellular phone, tablet PC, or the like).

Figure 24:
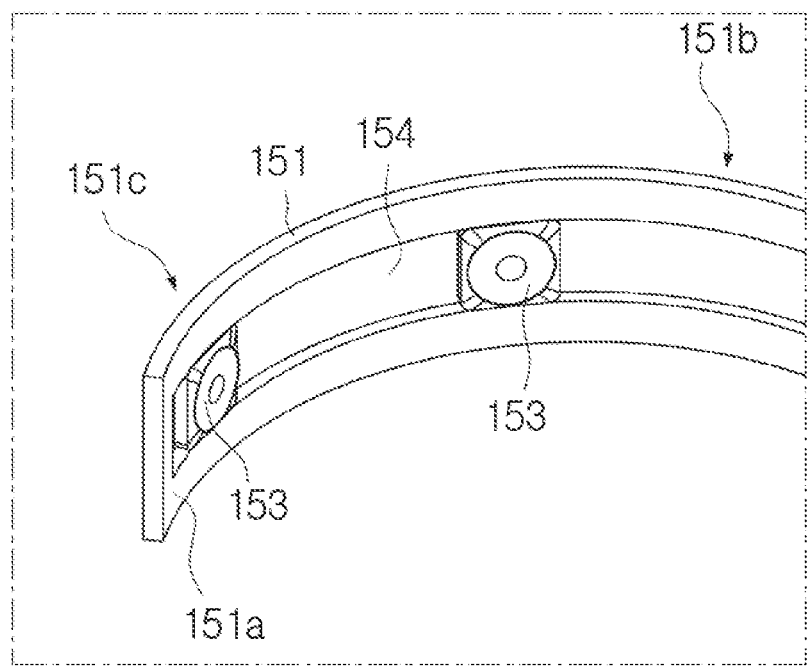
FIG. 24 is a perspective view illustrating a modified example of the headrest speaker frame illustrated in FIG. 23.
Figure 25A:
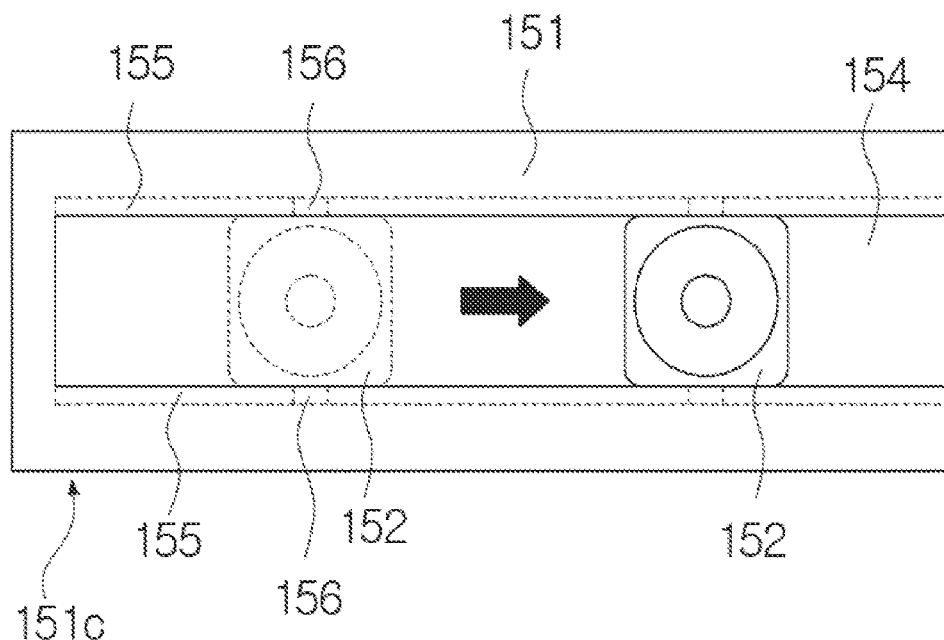
FIGS. 25A and 25B are front views schematically illustrating an operation of a speaker installed in the headrest speaker frame illustrated in FIG. 24.
Figure 25B:
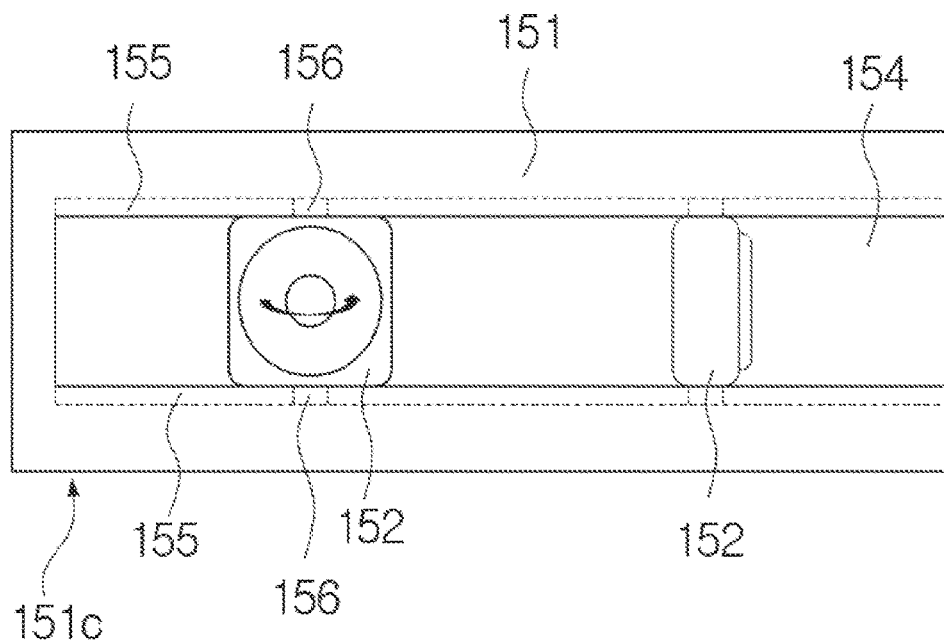

FIG. 24 is a perspective view illustrating a modified example of the headrest speaker frame illustrated in FIG. 23, and FIGS. 25A and 25B are front views schematically illustrating an operation of a speaker installed in the headrest speaker frame illustrated in FIG. 24.

Although FIGS. 24 to 25B, for convenience, illustrate only the first headrest speaker frame 151, it should be understood that the content to be described with reference to FIGS. 24 to 25B is applicable equally to the second headrest speaker frame 152. Also, likewise, the content to be described with reference to FIGS. 24 to 25B is applicable equally to the third headrest speaker frame and a fourth headrest speaker frame which will be described below.

Referring to FIGS. 24 to 25B, at least one speaker 153 installed in the first headrest speaker frame 151 may be installed to be able to slide in a direction in which the first headrest speaker frame 151 extends. Accordingly, there is an advantage that each user may be allowed to customize a sound system for himself or herself by adjusting a position of the at least one speaker 153 installed in the first headrest speaker frame 151.

Specifically, a sliding space 154 having a shape that is bent in the direction in which the first headrest speaker frame 151 extends may be formed on the inner side 151*a* of the first headrest speaker frame 151. The at least one speaker 153 may be installed in the sliding space 154. The sliding space 154 may be formed to pass through the first headrest speaker frame 151 but may also be formed while an outer side surface of the first headrest speaker frame 151 is blocked.

Referring to FIG. 25A, a sliding rail 155 may be selectively provided above and/or below the sliding space 154. A sliding member 156 provided above and/or below the speaker 153 installed in the sliding space 154 is installed to be able to slide on the sliding rail 155. The speaker 153 may slide in the direction in which the first headrest speaker frame 151 extends while being stably supported by the sliding rail 155 and additionally in the slide space 154 by the sliding member 156.

Meanwhile, referring to FIG. 25B, the sliding member 156 may be provided as a rotatable member so that the speaker 153 supported by the sliding rail 155 is rotatable in an axial direction.

Accordingly, the at least one speaker 153 installed in the first headrest speaker frame 151 is, while being slidable in the direction in which the first headrest speaker frame 151 extends, rotatable in the axial direction so as to implement more diverse sound environments.

Figure 26A:
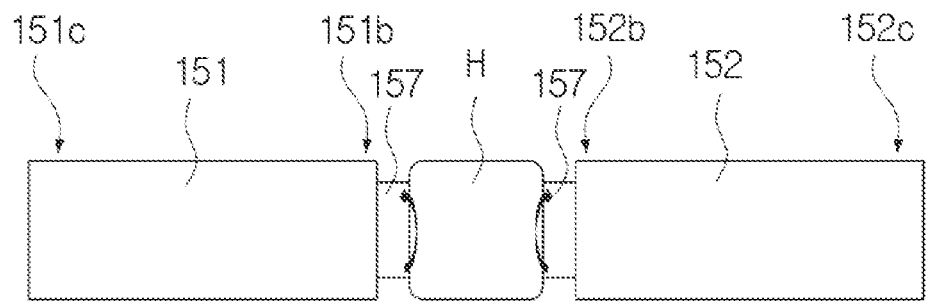
FIGS. 26A to 26C are front views illustrating a modified example of the headrest speaker frame illustrated in FIG. 23.
Figure 26B:
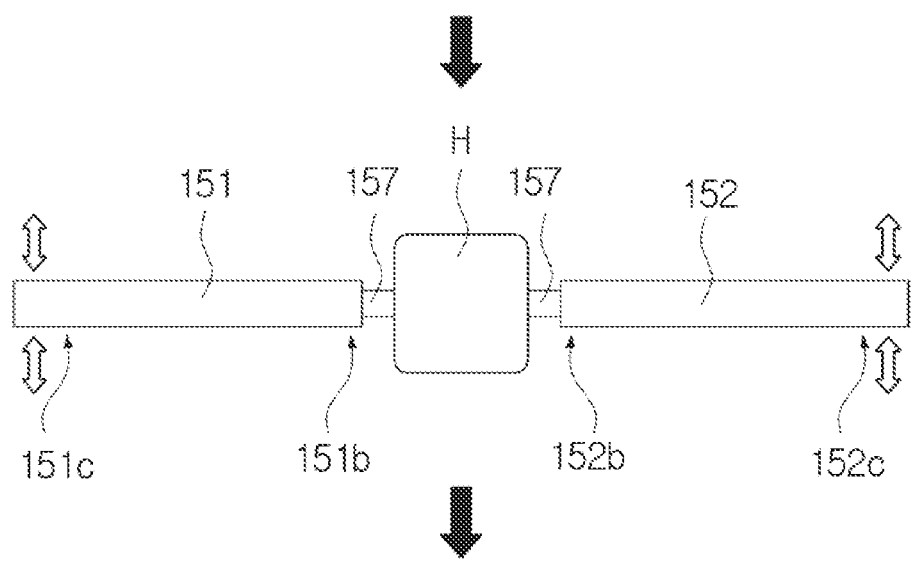
Figure 26C:
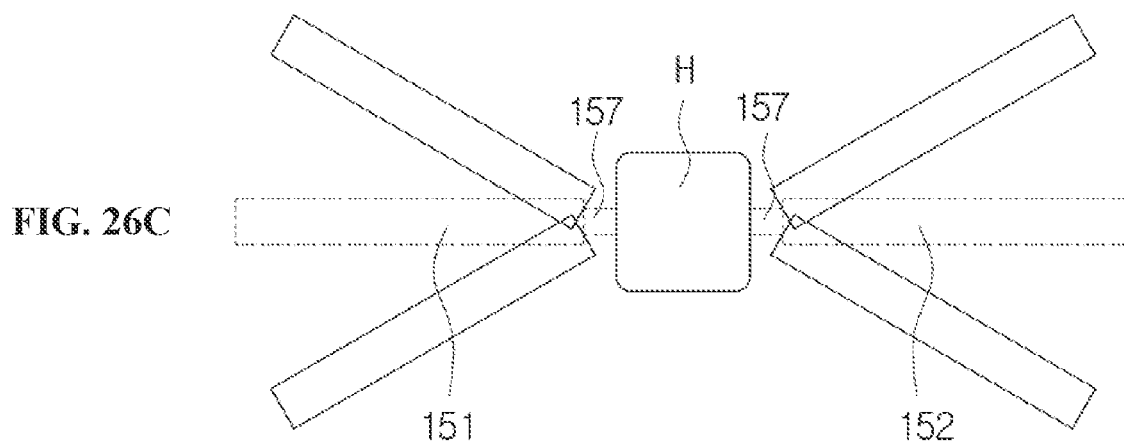

FIGS. 26A to 26C are front views illustrating a modified example of the headrest speaker frame illustrated in FIG. 23.

Referring to FIGS. 26A to 26C, the one end 151*b* of the first headrest speaker frame 151 and the one end 152*b* of the second headrest speaker frame 152 may be installed to be rotatable about a joint of the headrest portion H.

Specifically, the first headrest speaker frame 151 and the second headrest speaker frame 152 are rotatable in the extending directions thereof (see FIGS. 26A and 26B).

Also, here, joint portions 157 may allow the first headrest speaker frame 151 and the second headrest speaker frame 152 to be freely bendable with respect to the headrest portion H (see FIG. 26C).

Accordingly, when a user sits in the chair in which the headrest speaker frame 150 is installed or stands up from the chair, the directions and positions of the first headrest speaker frame 151 and the second headrest speaker frame 152 may be adjusted so as not to interfere with the user. In another case, the directions of the first headrest speaker frame 151 and the second headrest speaker frame 152 may be adjusted through manual adjustment by the user or automatic adjustment by a separate algorithm, and in this way, it can be possible to further optimize the directions in a state in which the user sits in the chair and to create a sound environment customized for the user.

Figure 27:
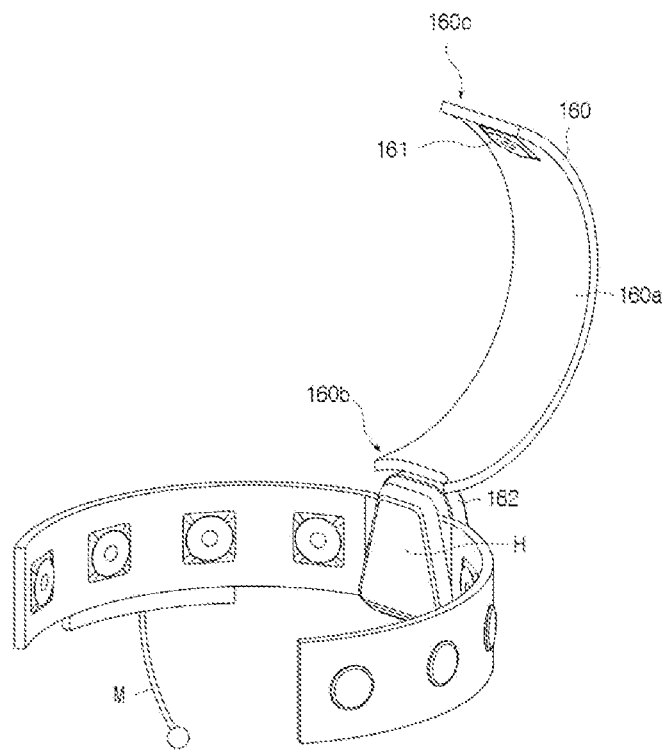
FIG. 27 is a perspective view illustrating the modified example of the headrest speaker frame illustrated in FIG. 23.
Figure 28:
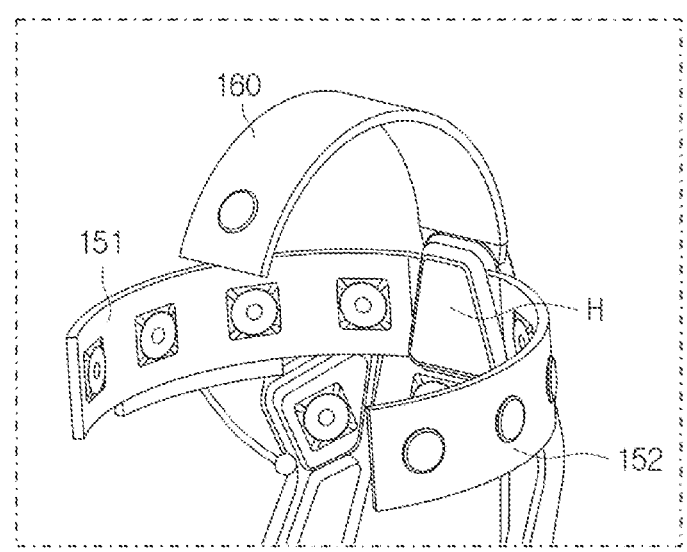
FIG. 28 is a perspective view illustrating a portion of a chair in which the headrest speaker frame illustrated in FIG. 27 is installed.

FIG. 27 is a perspective view illustrating the modified example of the headrest speaker frame illustrated in FIG. 23, and FIG. 28 is a perspective view illustrating a portion of the chair in which the headrest speaker frame illustrated in FIG. 27 is installed.

Referring to FIGS. 27 and 28, the first headrest speaker frame 151 and the second headrest speaker frame 152 are provided to extend from both sides of the headrest portion H, and above the headrest portion H, a third headrest speaker frame 160 which is provided to extend in a direction toward a portion above the headrest portion H and which has a speaker installation area in which at least one speaker 161 is installed defined on an inner side 160a may be installed. Here, a sound input device M may be provided in at least one selected from the first headrest speaker frame 151 and the second headrest speaker frame 152.

In the present embodiment, the third headrest speaker frame 160 having a shape that extends toward the front of the headrest portion H is provided above the headrest portion H. At least one speaker 161 may be installed on the inner side 160a of the third headrest speaker frame 160. In a case in which at least two speakers 161 are installed on the inner side 160a of the third headrest speaker frame 160, the two speakers 161 may be installed to be spaced apart from each other at a predetermined interval from one end 160b of the third headrest speaker frame 160 fixed to the headrest portion H toward the other end 160c of the third headrest speaker frame 160 not fixed to the headrest portion H.

In one embodiment, the one end 160b of the third headrest speaker frame 160 may be installed to be fixed to an upper portion of the headrest portion H, and the other end 160c of the third headrest speaker frame 160 not fixed to the headrest portion H may have a shape that is bent or curved toward the front of the headrest portion H or may have a linear shape or an angular shape which has at least one joint structure in the middle.

In this way, by being provided to be inclined toward the front of the headrest portion H, the other end 160c of the third headrest speaker frame 160 not fixed to the headrest portion H may allow sounds output from the at least one speaker 161 installed in the third headrest speaker frame 160 to be further concentrated on the user.

Also, in a case in which the speaker 161 installed in the third headrest speaker frame 160 is provided as a plurality of speakers 161, as the other end 160c of the third headrest speaker frame 160 not fixed to the headrest portion H is provided to be inclined toward the front of the headrest portion H, it is possible to maintain a constant distance between the plurality of speakers 161 installed in the third headrest speaker frame 160 and the user who sits in the chair. In particular, in this case, a constant distance can be maintained not only between the speakers 161 installed in the third headrest speaker frame 160 and the user but also between the plurality of speakers 153 installed in the first headrest speaker frame 151 and the second headrest speaker frame 152 and the user.

As described above, by the third headrest speaker frame 160 installed to extend to a portion above the headrest portion H and the at least one speaker 161 installed in the third headrest speaker frame 160, a multi-channel sound system can be implemented by receiving and outputting a multi-channel sound signal from a separately-provided sound source (e.g., home theater, TV, set-top box, sound bar, computer, cellular phone, tablet PC, or the like).

In yet another embodiment, the one end 160b of the third headrest speaker frame 160 may be installed to be hinge-rotatable about the headrest portion H with a hinge portion 162 as a medium.

In this case, when a user sits in the chair in which the third headrest speaker frame 160 is installed or stands up from the chair, the direction of the third headrest speaker frame 160 may be adjusted so as not to interfere with the user. In another case, the direction of the third headrest speaker frame 160 may be adjusted through manual adjustment by the user or automatic adjustment by a separate algorithm, and in this way, it can be possible to further optimize the directions in a state in which the user sits in the chair and to create a sound environment customized for the user.

Figure 29:
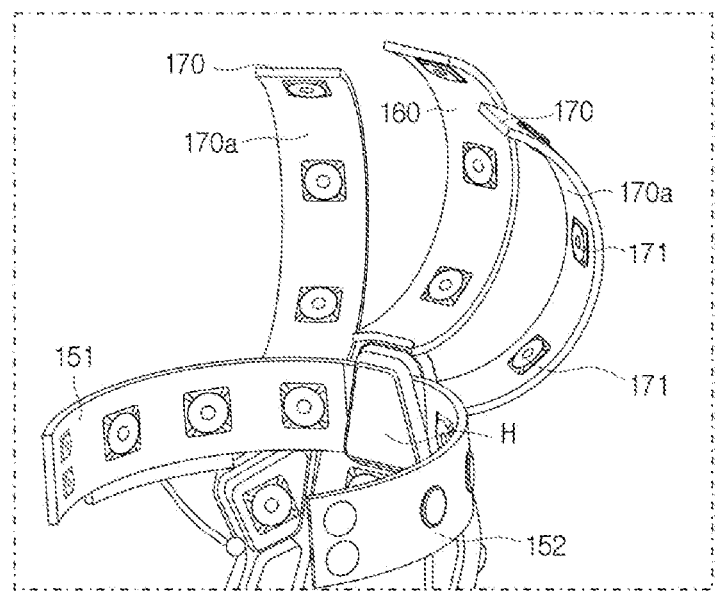
FIG. 29 is a perspective view illustrating a portion of a chair in which a modified example of the headrest speaker frame illustrated in FIG. 27 is installed.

FIG. 29 is a perspective view illustrating a portion of a chair in which a modified example of the headrest speaker frame illustrated in FIG. 27 is installed.

Referring to FIG. 29, at least one fourth headrest speaker frame 170 may be installed in at least one area selected from an area between the first headrest speaker frame 151 and the third headrest speaker frame 160 and an area between the second headrest speaker frame 152 and the third headrest speaker frame 160.

In the present embodiment, the fourth headrest speaker frame 170 having a shape that extends toward the front of the headrest portion H is provided in at least one area selected from the area between the first headrest speaker frame 151 and the third headrest speaker frame 160 and the area between the second headrest speaker frame 152 and the third headrest speaker frame 160. At least one speaker 171 may be installed on an inner side 170a of the fourth headrest speaker frame 170. In a case in which at least two speakers 171 are installed on the inner side 170a of the fourth headrest speaker frame 170, the two speakers 171 may be installed to be spaced apart from each other at a predetermined interval from one end of the fourth headrest speaker frame 170 fixed to the headrest portion H toward the other end of the fourth headrest speaker frame 170 not fixed to the headrest portion H.

In one embodiment, the one end of the fourth headrest speaker frame 170 may be installed to be fixed to an upper portion of the headrest portion H, and the other end of the fourth headrest speaker frame 170 not fixed to the headrest portion H may have a shape that is bent or curved toward the front of the headrest portion H or may have a linear shape or an angular shape which has at least one joint structure in the middle.

In this way, by being provided to be inclined toward the front of the headrest portion H, the other end of the fourth headrest speaker frame 170 not fixed to the headrest portion H may allow sounds output from the at least one speaker 171 installed in the fourth headrest speaker frame 170 to be further concentrated on the user.

Also, in a case in which the speaker 171 installed in the fourth headrest speaker frame 170 is provided as a plurality of speakers 171, as the other end of the fourth headrest speaker frame 170 not fixed to the headrest portion H is provided to be inclined toward the front of the headrest portion H, it is possible to maintain a constant distance between the plurality of speakers 171 installed in the fourth headrest speaker frame 170 and the user who sits in the chair. In particular, in this case, a constant distance can be maintained not only between the speakers 171 installed in the fourth headrest speaker frame 170 and the user but also between the plurality of speakers 153 and 161 installed in the second headrest speaker frame 152 and the third headrest speaker frame 160 and the user.

As described above, by the fourth headrest speaker frame 170 installed to extend to a portion above the headrest portion H and the at least one speaker 171 installed in the fourth headrest speaker frame 170, a multi-channel sound system can be implemented by receiving and outputting a multi-channel sound signal from a separately-provided sound source (e.g., home theater, TV, set-top box, sound bar, computer, cellular phone, tablet PC, or the like).

In yet another embodiment, the one end of the fourth headrest speaker frame 170 may be installed to be hinge-rotatable about the headrest portion H like the one end 160*b* of the third headrest speaker frame 160.

In this case, when a user sits in the chair 100 or stands up from the chair 100, the direction of the fourth headrest speaker frame 170 may be adjusted so as not to interfere with the user. In another case, the direction of the fourth headrest speaker frame 170 may be adjusted through manual adjustment by the user or automatic adjustment by a separate algorithm, and in this way, it can be possible to further optimize the directions in a state in which the user sits in the chair and to create a sound environment customized for the user.

Figure 30:
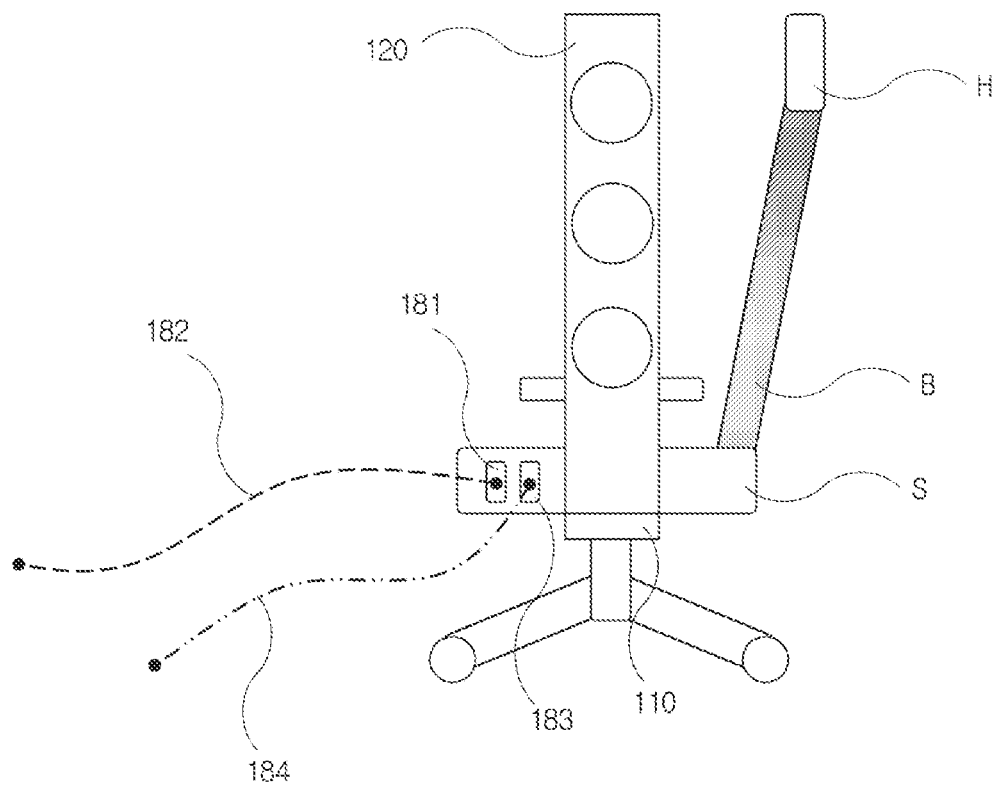
FIG. 30 is a lateral view of a chair according to yet another embodiment of the present invention.

FIG. 30 is a lateral view of a chair according to yet another embodiment of the present invention.

Referring to FIG. 30, the chair 100 may further include a binding portion 181 configured to bind the chair 100 to an arbitrary structure. For example, the binding portion 181 may bind the chair 100 to a structure such as furniture, a desk, or the like with a binding cable 182 as a medium to limit the movement radius of the chair 100.

Also, the chair 100 may include a reception portion 183 to allow the speaker 120 installed in the frame 110 to receive sound signals through wires. A reception cable 184 extending from the reception portion 183 may receive sound signals by being directly connected to an audio source (e.g., home theater, TV, set-top box, sound bar, computer, cellular phone, tablet PC, or the like) or being connected to an audio relay source configured to receive sound signals wirelessly from the audio source. Meanwhile, the reception portion 183 may receive sound signals wirelessly without using the reception cable 184.

In a case in which the chair 100 moves excessively in a state in which the reception cable 184 is connected to the audio source or the audio relay source, there is a concern of damage to the reception cable 184, the reception portion 183 or the audio source to which the reception cable 184 is connected, and the like, and such a problem can be prevented by binding the chair 100 to an arbitrary structure and limiting the movement radius of the chair 100 using the binding cable 182.

Meanwhile, the binding portion 181 and the reception portion 183 may be integrally provided unlike those illustrated in FIG. 30. In this case, the binding cable 182 and the reception cable 184 may be integrally provided or provided to have different lengths.

Embodiments of the present invention have been described above, but those of ordinary skill in the art may make various modifications and changes to the present invention by adding, changing, or omitting components within the scope not departing from the spirit of the present invention, and such modifications and changes also belong to the scope of rights of the present invention.

What is claimed is:

1. A chair including at least 1) a backrest portion configured to support a back and waist part of a user and 2) a seat portion configured to support a buttocks part and a part of legs of the user, the chair comprising:
    a frame which is installed on at least one selected from the backrest portion and the seat portion and has one end portion where a speaker installation area in which at least one speaker is installed is defined,
    wherein the frame is provided to extend in a predetermined direction and includes at least one left side frame configured to pass through a center of the chair and positioned at a left side with respect to a virtual reference line connecting a front and a rear of the chair and at least one right side frame configured to pass through the center of the chair and positioned at a right side with respect to the virtual reference line connecting the front and the rear of the chair, and
    each of the left side frame and the right side frame includes at least one front frame configured to pass through the center of the chair and positioned at a front with respect to a virtual reference line connecting both sides of the chair, or at least one rear frame configured to pass through the center of the chair and positioned at a rear with respect to the virtual reference line connecting both sides of the chair, and
    wherein a frame rotating shaft is positioned inside or below the seat portion, and the frame is provided to be connected to the frame rotating shaft to be rotatable within a predetermined angle range on a plane.

2. The chair of claim 1, wherein the frame is provided so that a length at which the frame extends is adjustable from an end opposite the end connected to the frame rotating shaft.

3. The chair of claim 1, wherein the frame includes:
    a fixing frame which has one end portion fixed to the chair and is provided to extend in a predetermined direction; and
    a longitudinal auxiliary frame installed on the other end portion of the fixing frame and provided to, on a vertical plane, extend to intersect a direction in which the fixing frame extends,
    wherein a speaker installation area in which at least one speaker is installed is defined in a direction in which the longitudinal auxiliary frame extends.

4. The chair of claim 1, wherein the frame includes:
    a fixing frame which has one end portion fixed to the chair and is provided to extend in a predetermined direction; and
    a longitudinal auxiliary frame installed on the other end portion of the fixing frame and provided to, on a vertical plane, extend to intersect a direction in which the fixing frame extends,
    wherein at least one transverse auxiliary frame provided to, on a horizontal plane, extend to intersect the longitudinal auxiliary frame is installed in a direction in which the longitudinal auxiliary frame extends, and
    a speaker installation area in which at least one speaker is installed is defined in a direction in which the transverse auxiliary frame extends.

5. The chair of claim 1, wherein the speaker installation area defined in the one end portion of the frame includes:
    a speaker rotating shaft; and
    a speaker installation stand provided to be connected to the speaker rotating shaft to be rotatable,
    wherein at least one speaker is provided to be installed on the speaker installation stand to be axially rotatable.

6. The chair of claim 5, wherein the speaker installation stand is provided to be able to move upward or downward with respect to the speaker rotating shaft.

7. The chair of claim 5, wherein the speaker rotating shaft is provided to be able to slide a predetermined length in a direction in which the frame extends.

8. The chair of claim 1, wherein the speaker installation area defined in the one end portion of the frame includes:
    a speaker lifting/lowering shaft; and a speaker installation stand connected to the speaker lifting/lowering shaft, wherein at least one speaker is provided to be installed on the speaker installation stand to be able to move upward or downward.

9. The chair of claim 1, wherein the one end portion of the frame is provided to be able to move upward or downward by a tilting device.

* * * * *